United States Patent [19]

Rysek et al.

[11] Patent Number: 4,468,339
[45] Date of Patent: Aug. 28, 1984

[54] AQUEOUS COMPOSITIONS CONTAINING OVERBASED MATERIALS

[75] Inventors: Joseph J. Rysek, Concord Township, Lake County; John W. Forsberg, Mentor on the Lake, both of Ohio

[73] Assignee: The Lubrizol Corporation, Wickliffe, Ohio

[21] Appl. No.: 340,211

[22] Filed: Jan. 21, 1982

[51] Int. Cl.$^3$ .................. C10M 1/10; C10M 1/16; C10M 1/32; C10M 3/04

[52] U.S. Cl. .................. 252/75; 252/33.4; 252/49.5; 252/77

[58] Field of Search .................. 252/33.4, 49.5, 75, 252/77

[56] References Cited

U.S. PATENT DOCUMENTS

| | | | |
|---|---|---|---|
| 2,616,904 | 11/1952 | Asseff et al. | 260/399 |
| 2,616,905 | 11/1952 | Asseff et al. | 260/399 |
| 2,616,906 | 11/1952 | Asseff et al. | 260/399 |
| 2,616,911 | 11/1952 | Asseff et al. | 260/413 |
| 2,616,924 | 11/1952 | Asseff et al. | 260/504 |
| 2,616,925 | 11/1952 | Asseff et al. | 260/504 |
| 2,617,049 | 11/1952 | Asseff et al. | 260/503 |
| 2,695,910 | 11/1954 | Asseff et al. | 260/413 |
| 2,723,234 | 11/1955 | Asseff et al. | 252/32.7 |
| 2,723,235 | 11/1955 | Asseff et al. | 252/32.7 |
| 2,723,236 | 11/1955 | Asseff et al. | 252/32.7 |
| 2,760,970 | 11/1956 | Le Suer | 260/429 |
| 2,767,164 | 10/1956 | Asseff et al. | 260/139 |
| 2,767,209 | 10/1956 | Asseff et al. | 252/32.7 E |
| 2,777,874 | 1/1957 | Asseff et al. | 260/504 |
| 2,798,852 | 7/1957 | Wiese et al. | 252/42.7 |
| 2,856,359 | 10/1958 | Schlicht | 252/33 |
| 2,856,361 | 10/1958 | Schlicht | 252/33 |
| 2,861,951 | 11/1958 | Carlyle | 252/33 |
| 2,883,340 | 4/1959 | Wasley et al. | 252/33 |
| 2,915,517 | 12/1959 | Le Suer | 260/139 |
| 2,959,551 | 11/1960 | Le Suer | 252/42.7 |
| 2,968,642 | 11/1961 | Le Suer | 260/45.75 |
| 2,971,014 | 2/1961 | Mastin | 260/398 |
| 2,989,463 | 6/1961 | Mastin | 252/25 |
| 3,001,981 | 9/1961 | Le Suer | 260/139 |
| 3,027,325 | 3/1962 | McMillen et al. | 252/33 |
| 3,079,908 | 3/1963 | Hunt | 125/17 |
| 3,108,960 | 10/1963 | Le Suer | 252/32.7 |
| 3,133,019 | 5/1964 | Otto et al. | 252/33 |
| 3,146,201 | 8/1964 | Butler | 252/32.5 |
| 3,147,232 | 9/1964 | Norman et al. | 260/23 |
| 3,152,991 | 10/1964 | Gragson | 252/33 |
| 3,155,616 | 11/1964 | Voorhees | 252/33 |
| 3,169,923 | 2/1965 | Guarnaccio et al. | 252/32.5 |
| 3,170,880 | 2/1965 | Voorhees | 252/327 |
| 3,170,881 | 2/1965 | Voorhees | 252/32.7 |
| 3,172,855 | 3/1965 | Rogers et al. | 252/32.7 |
| 3,194,823 | 7/1965 | Le Suer et al. | 260/414 |
| 3,216,936 | 11/1965 | Le Suer | 252/32.7 |
| 3,219,666 | 11/1965 | Norman et al. | 252/51.5 A |
| 3,223,630 | 12/1965 | Gragson | 252/33 |
| 3,232,883 | 2/1966 | Le Suer | 252/32.5 |
| 3,242,079 | 3/1966 | McMillen | 252/33 |
| 3,242,080 | 3/1966 | Wiley et al. | 252/33 |
| 3,269,946 | 8/1966 | Wiese | 252/74 |
| 3,708,522 | 1/1973 | Le Suer | 252/52 R |
| 3,766,066 | 10/1973 | McMillen | 252/33.4 |
| 4,257,902 | 3/1981 | Singer | 252/18 |
| 4,368,133 | 1/1983 | Forsberg | 252/75 |

Primary Examiner—John E. Kittle
Assistant Examiner—Robert A. Wax
Attorney, Agent, or Firm—Denis A. Polyn; Raymond F. Keller; Walter C. Danison

[57] ABSTRACT

An aqueous composition comprising: (A) water; (B) an overbased material dispersed with component (A), said overbased material being selected from the group consisting of (B)(I) a Newtonian overbased material or (B)(II) a non-Newtonian colloidal disperse system comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions; and an effective amount of at least one additional component to disperse component (B) with component (A), said additional component being selected from the group consisting of (C) at least one nitrogen-containing, phosphorus-free carboxylic solubilizer made by the reaction of (C)(I) at least one carboxylic acid acylating agent having at least one hydrocarbon-based substituent of about 12 to about 500 carbon atoms which (C)(II) at least one (a) N-(hydroxyl-substituted hydrocarbyl) amine, (b) hydroxyl-substituted poly(hydrocarbyloxy) analog of said amine or (c) mixture of (a) and (b), (D) at least one surfactant, or (E) mixture of (C) and (D). The foregoing aqueous compositions are optionally provided in combination with (F) a functional additive and/or (G) a dispersion enhancer selected from the group consisting of polyhydroxy compounds and partial ethers of polyhydroxy compounds. A method for cutting hard materials such as quartz, silicon and the like utilizing the foregoing compositions, as well as abrasive slurries for said cutting method and for conventional lapping applications and for metal working or polishing applications is provided.

62 Claims, No Drawings

AQUEOUS COMPOSITIONS CONTAINING OVERBASED MATERIALS

FIELD OF THE INVENTION

This invention relates to aqueous compositions comprising overbased materials in combination with carboxylic solubilizers and/or surfactants. The overbased materials are selected from Newtonian overbased materials, and non-Newtonian colloidal disperse systems comprising solid metal-containing colloidal particles predispersed in a disperse medium of at least one inert organic liquid and a third component selected from the class consisting of organic compounds which are substantially soluble in said disperse medium, the molecules of said organic compound being characterized by polar substituents and hydrophobic portions. The carboxylic solubilizers are made from acylating agents having hydrocarbyl substituents of about 12 to about 500 carbon atoms and N-(hydroxyl-substituted hydrocarbyl)amines and/or hydroxyl-substituted poly(hydrocarbyloxy) analog of said amine. These aqueous compositions optionally contain dispersion enhancers selected from the group consisting of polyhydroxy compounds or partial ethers of polyhydroxy compounds, and/or functional additives.

BACKGROUND OF THE INVENTION

The terms "overbased", "superbased", and "hyperbased", are terms of art which are generic to well known classes of metal-containing materials which for the last several decades have been employed as detergents and/or dispersants in lubricating oil compositions. These overbased materials which have also been referred to as "complexes", "metal complexes", "high-metal containing salts", and the like, are characterized by a metal content in excess of that which would be present according to the stoichiometry of the metal and the particular organic compound reacted with the metal, e.g., a carboxylic or sulfonic acid. In recent times, the increasing costs and scarcity of petroleum has made it increasingly desirable to replace oil-based compositions with aqueous systems wherever possible. Other benefits can also flow from such replacements such as decreased fire hazard and environmental pollution problems. In many cases, however, it is not feasible to make such replacements because the aqueous systems cannot be modified in their properties so as to perform to the same high degree as their oil-based counterparts do. For example, it has been often difficult, and even impossible to replace certain oil-based hydraulic fluids with water-based fluids even though the desirability of doing so is evident.

Newtonian overbased materials and non-Newtonian colloidal disperse systems comprising solid metal-containing colloidal particles predispersed in a disperse medium of at least one inert organic liquid and a third component selected from the class consisting of organic compounds which are substantially insoluble in said disperse medium are known. See, for example, U.S. Pat. Nos. 3,492,231; and 4,230,586.

Carboxylic acid derivatives made from high molecular weight carboxylic acid acylating agents and amino compounds and their use in oil-based lubricants are well known. See, for example, U.S. Pat. Nos. 3,216,936; 3,219,666; 3,502,677; and 3,708,522.

Certain alkyl succinic acid/alkanol amine condensates have also been described; see, for example, U.S. Pat. No. 3,269,946. Water-in-oil emulsions containing alkyl and alkenyl succinic acid derivatives are also known; see, for example, U.S. Pat. Nos. 3,255,108; 3,252,908 and 4,185,485.

Surfactants are also well known. See, for example, the text entitled "Non-ionic Surfactants" edited by M. J. Schick, published by Marcel Dekker, Inc., New York, 1967 and McCutcheon's "Detergents and Emulsifiers", 1978, North American Edition, published by McCutcheon's Division, MC Publishing Corporation, Glen Rock, N.J., U.S.A.

Oil-soluble, water-insoluble functional additives are also well known. See, for example, the treatises by C. B. Smalheer and R. Kennedy Smith, published by Lezius-Hiles Co., Cleveland, Ohio, 1967, and by M. W. Ranney, published by Noyes Data Corp., Parkridge, N.J., 1973 entitled "Lubricant Additives". In this connection, and throughout the specification and appended claims, a water-insoluble functional additive is one which is not soluble in water above a level of about 1 gram per 100 milliliters of water at 25° but is soluble in mineral oil to the extent of at least one gram per liter at 25°.

It would be advantageous to provide aqueous compositions containing overbased materials and optionally other functional additives that would be useful in preparing aqueous concentrates and systems which could be used to replace certain oil-based compositions of the prior art.

SUMMARY OF THE INVENTION

The present invention comprises aqueous compositions containing overbased materials and optionally other functional additives which are useful in providing aqueous concentrates and systems which can be used to replace certain oil-based compositions in the prior art. Broadly stated, the present invention contemplates the provision of an aqueous composition comprising: (A) water; (B) an overbased material dispersed with component (A), said overbased material being selected from the group consisting of (B)(I) a Newtonian overbased material or (B)(II) a non-Newtonian colloidal disperse system comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents in hydrophobic portions; and an effective amount of at least one additional component to disperse component (B) with component (A), said additional component being selected from the group consisting of (C) at least one nitrogen-containing, phosphorus-free carboxylic solubilizer made by the reaction of (C)(I) at least one carboxylic acid acylating agent having at least one hydrocarbon-based substituent of at least about 12 to about 500 carbon atoms with (C)(II) at least one (a) N-(hydroxyl-substituted hydrocarbyl)amine, (b) hydroxyl-substituted poly(hydrocarbyloxy) analog of said amine or (c) mixture of (a) and (b); or (D) at least one surfactant; or (E) mixture of (C) and (D). The foregoing aqueous compositions in combination with (F) a functional additive and/or (G) a dispersion enhancer selected from the group consisting of polyhydroxy compounds and partial ethers of polyhydroxy compounds are also within the scope of the invention.

The aqueous compositions of the present invention contain a sufficient amount of water to provide a dispersion of component (B) with water. Preferably these compositions contain at least about 25% of water with the proviso that said compositions contain less than about 50% hydrocarbyl oil. Such compositions encompass both concentrates containing about 25% to about 70% water, water-based functional fluids made from such concentrates with water wherein the ratio of water to concentrate is in the range of about 80:20 to about 99:1, and water-based functional fluids wherein the ratio of water to non-aqueous components is in the range of about 80:20 to 99:1 (said ratios being by weight).

Methods for preparing aqueous systems by the steps of:

(1) mixing the aforedescribed combination of components (A) and (B) with component (C), (D) or (E) and optionally components (F) and/or (G) to form a dispersion/solution, the water content of said dispersion/solution preferably being less than about 25% by weight; optionally (2) combining said dispersion/solution with water to form said concentrate; and/or optionally (3) diluting said concentrate or dispersion/solution with water wherein the total amount of water used is in the amount required to provide the desired concentration of component (B) in water;

are within the scope of the invention. Alternatively, the amount of water used in step (2) or (3) can be such that the functional fluid is made directly without going through the separate step of forming a concentrate.

A method for cutting or wafering a workpiece comprising a hard material such as quartz, silicon, germanium, gem stones, glass and the like is also within the scope of the present invention. This method comprises the steps of: providing a slurry saw comprising at least one cutting band, a frame for carrying said cutting band, means for moving said frame while maintaining said band in contact with said workpiece, and means for applying a slurry to the point of contact of said band and said workpiece; providing a slurry comprising an abrasive and the aqueous composition of the present invention; moving said frame while maintaining said band in contact with said workpiece and simultaneously applying said slurry to the point of contact of said band and said workpiece until the desired cut in said workpiece is made.

The invention further contemplates the provision of a slurry for use in cutting or lapping hard materials such as quartz, silicon, germanium, gem stones, glass and the like, or for metal working or polishing applications, the slurry comprising the aqueous composition of the invention and an abrasive.

DETAILED DESCRIPTION OF THE PREFERRED EMBODIMENT

The Overbased Material (B):

As indicated above, the terms "overbased," "superbased," and "hyperbased," are terms of art which are generic to well known classes of metal-containing materials which have generally been employed as detergents and/or dispersants in lubricating oil compositions. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

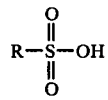

is neutralized with a basic metal compound, e.g., calcium hydroxide, the "normal" metal salt produced will contain one equivalent of calcium for each equivalent of acid, i.e.,

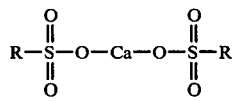

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents.

The actual stoichiometric excess of metal can vary considerably, for example, from about 0.1 equivalent to about 30 or more equivalents depending on the reactions, the process conditions, and the like. The overbased materials useful in accordance with the present invention contain from about 3.5 to about 30 or more equivalents of metal for each equivalent of material which is overbased.

In the present specification and claims the term "overbased" is used to designate materials containing a stoichiometric excess of metal and is, therefore, inclusive of those metals which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Component (B)(I):

Generally, these overbased materials are prepared by treating a reaction mixture comprising the organic material to be overbased, aC reaction medium consisting essentially of at least one inert, organic solvent for said organic material, a stoichiometric excess of a metal base, and a promoter with an acidic material. The methods for preparing the overbased materials as well as an extremely diverse group of overbased materials are well known in the prior art and are disclosed for example in the following U.S. Pat. Nos. 2,616,904; 2,616,905; 2,616,906, 2,616,911; 2,616,924; 2,616,925; 2,617,049; 2,695,910; 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful in producing the disperse systems of component (B)(II) of this invention and are, accordingly, incorporated herein by reference.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patent and are, accordingly, incorporated herein by reference. U.S. Pat. No. 2,777,874 identified organic acids suitable for preparing overbased materials which can be converted to disperse systems for use in the resinous compositions of the invention. Similarly, U.S. Pat. Nos. 2,616,904; 2,695,910; 2,767,164; 2,767,209; 3,147,232; 3,274,135; etc. disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are found in U.S. Pat. No. 2,798,852. A variety of overbased materials derived from oil-soluble metal-free, non-tautomeric neutral and basic organic polar compounds such as ester, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred disperse systems of the invention are made from overbased materials containing calcium and/or barium as the metal.

The promoters, that is, the materials which permit the incorporation of the excess metal into the overbased material, are also quite diverse and well known in the art as evidenced by the cited patents. A particularly comprehensive discussion of suitable promoters is found in U.S. Pat. Nos. 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Suitable acidic materials are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. The most preferred acidic materials are carbon dioxide and acetic acid.

In preparing overbased materials, the material to be overbased, an inert, non-polar, organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems (i.e., component (B)(II)) made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions of the present invention to forming the disperse system or thereafter.

Component (B)(II):

The terminology "disperse system" as used in the specification and claims is a term of art generic to colloids or colloidal solutions, e.g., "any homogeneous medium containing dispersed entities of any size and state," Jirgensons and Straumanis, "A Short Textbook on Colloidal Chemistry" (2nd Ed.) The Macmillan Co., New York, 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems of component (B)(II). Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids, and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid metal-containing particles and the disperse medium, the colloidal disperse systems of the invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component, and a polar layer bridging said metal-containing layer and said hydrophobic layer, said polar bridging layer comprising the polar substituents of the third component of the system, e.g., the

group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The medium can have components characterized by relatively low boiling points, e.g., in the range of 25° to 120° C. to facilitate subsequent removal of a portion or substantially all of the medium from the aqueous compositions of the invention or the components can have a higher boiling point to protect against removal from such compositions upon standing or heating. There is no criticality in an upper boiling point limitation on these liquids.

Representative liquids include mineral oils, the alkanes and haloalkanes of five to eighteen carbons, polyhalo- and perhaloalkanes of up to about six carbons, the cycloalkanes of five or more carbons, the corresponding alkyl-and/or halo-substituted cycloalkanes, the aryl hydrocarbons, the alkylaryl hydrocarbons, the haloaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluoro-tetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide diethylacetamide, propionamide, diisooctyl azelate, ethylene glycol, polypropylene glycols, hexa-2-ethylbutoxy disiloxane, etc.

Also useful as dispersing medium are the low molecular weight, liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium.

In addition to the solid, metal-containing particles and the disperse medium, the disperse systems employed herein require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

A preferred class of overbased materials (i.e., component (B)(I)) used as starting materials in the preparation of the dispersé systems of the present invention (i.e., component (B)(II)) are the alkaline earth metal-overbased oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids suitable for preparing these overbased materials are discussed and identified in detail in the above-cited patents. Particularly U.S. Pat. Nos. 2,616,904 and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.-5000)-substituted succinic acid, polypropylene, (M.W.-10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydro-naphthalene carboxylic acid, didodecyl-tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, laurylcyclohexanesulfonic acids, polyethylene (M.W.-750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least twelve.

Within this preferred group of overbased carboxylic and sulfonic acids, the barium and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum maphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, oleic acid, linoletic acid, linolenic acid, oleostearic acid, stearic acid, myristic acid, and undecalinic acid, alpha-chlorostearic acid, and alpha-nitrolauric acid.

As shown by the representative examples of the preferred classes of sulfonic and carboxylic acids, the acids may contain nonhydrocarbon substituents such as halo, nitro, alkoxy, hydroxyl, and the like.

It is desirable that the overbased materials used to prepare the disperse system have a metal ratio of at least about 3.5 and preferably about 4.5. An especially suitable group of the preferred sulfonic acid overbased materials has a metal ratio of at least about 7.0. While overbased materials having a metal ratio of 75 have been prepared, normally the maximum metal ratio will not exceed about 30 and, in most cases, not more than about 20.

The overbased materials used in preparing the aqueous compositions of the present invention and/or the colloidal disperse systems utilized in the compositions of the invention contain from about 10% to about 70% by weight of metal-containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials consist essentially of the inert organic reaction medium and any promoter which is not removed from the overbased product. For purposes of this application, the organic material which is subjected to overbasing is considered a part of the metal-containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used herein is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentathol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monomethyl-ether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g., alkyl-$B(OH)_2$ or aryl-$B(OH_2)$), boric acid (i.e., $H_3BO_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., $P_3O_5$ and $P_2S_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials (i.e., component (B)(I)) are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the aqueous compositions of the invention. In such cases, it is advantageous to permit the conversion agents to remain in the disperse system until it is mixed with such aqueous compositions. Thereafter, the conversion agents can be removed from such compositions by conventional devolatilization techniques if desired.

To better illustrate the colloidal disperse systems utilized in the invention, the procedure for preparing a preferred system is described below:

As stated above, the essential materials for preparing an overbased product are (1) the organic material to be overbased, (2) an inert, nonpolar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-phenatanol is heated to 35° C. and subjected to the following operating cycle four times: mixing with 143 grams of 90% calcium hydroxide and treating the mixture with carbon dioxide until it has a base number of 32–39. The resulting product is then heated to 155° C. during a period of 9 hours to remove the alcohols and then filtered at this temperature. The filtrate is a calcium overbased petrosulfonate having a metal ratio of 12.2.

A mixture of 150 parts of the foregoing overbased material, 15 parts of methyl alcohol, 10.5 parts of n-pentanol and 45 parts of water is heated under reflux conditions at 71°–74° C. for 13 hours. The mixture becomes a gel. It is then heated to 144° over a period of 6 hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present invention.

The disperse systems of component (B)(II) are characterized by three essential components: (1) solid, metal-containing particles formed in situ, (2) an inert, nonpolar, organic liquid which functions as the disperse medium, and (3) an organic compound which is soluble in the disperse medium and the molecules of which are characterized by a hydrophobic portion and at least one polar substituent. In the colloidal disperse system described immediately above, these components are as follows: (1) calcium carbonate in the form of solid particles, (2) mineral oil, and (3) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material.

It is also readily seen that the solid, metal-containing particles formed in situ possess the same chemical composition as would the reaction products of the metal base and the acidic material used in preparing the overbased materials. Thus, the actual chemical identify of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems (i.e., component (B)(II)) are of a size sufficient for detection by X-ray diffraction. The overbased material prior to conversion (i.e., component (B)(I)) are not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in the disperse system prepared herein above, the calcium carbonate is present as solid calcium carbonate having a particle size of about 40 to 50 A. (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bonded by any theory offered to explain the changes which accompany the conversion step, it appears that conversion permits particle formation and growth. That is, the amorphous, metal-containing apparently dissolved salts or complexes present in the overbased material form solid, metal-containing particles which by a process of particle growth become colloidal particles. Thus, in the above example, the dissolved amorphous calcium carbonate salt or complex is transformed into solid particles which then "grow". In this example, they grow to a size of 40 to 50 A. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various polymeric compositions thus facilitating the uniform distribution of the particles throughout the polymeric resin composition. This pre-wet, pre-dispersed character of the solid metal-containing particles resulting from their in situ formation is, thus, an important feature of the disperse systems.

In the foregoing example, the third component of the disperse system of component (B)(II) (i.e., the organic compound which is soluble in the disperse medium and which is characterized by molecules having a hydrophobic portion and a polar substituent) is calcium petrosulfonate,

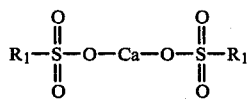

wherein $R_1$ is the residue of the petrosulfonic acid. In this case, the hydrophobic portion of the molecule is the hydrocarbon moiety of petrosulfonic, i.e.,—$R_1$. The polar substituent is the metal salt moiety,

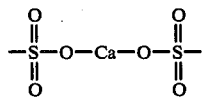

The hydrophobic portion of the organic compound is a hydrocarbon radical or a substantially hydrocarbon radical containing at least about twelve aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contain polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

Examples 1-84 illustrate various overbased materials (i.e., component (B)(I)) and colloidal disperse systems (i.e., component (B)(II)) prepared from these overbased materials. Unless otherwise indicated, "percentages" and "parts" refer to percent by weight and parts by weight. Where temperatures exceed the boiling points of the components of the reaction mixture, obviously reflux conditions are employed unless the reaction products are being heated to remove volatile components.

Examples 1 through 43 are directed to the preparation of (B)(I) Newtonian overbased materials illustrative of the types which can be used in the aqueous compositions of the invention or to prepare (B)(II) non-Newtonian colloidal disperse systems. The term "naphtha" as used in the following examples refers to petroleum distillates boiling in the range of about 90° C. to about 150° C. and usually designated Varnish Maker's and Painter's Naphtha.

EXAMPLE 1

To a mixture of 3,245 grams (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°–84° C. The mixture is heated at 100° C. for 1 hour to remove substantially all water and blown with 75 parts of carbon dioxide at 133° to 170° C. within a period of 3 hours. A mixture of 1,000 grams of the above carbonated intermediate product, 121.8 parts of octylphenol, and 234 parts of barium hydroxide is heated at 100° C. and then at 150° C. for 1 hour. The mixture is then blown with carbon dioxide at 150° C. for 1 hour at a rate of 3 cubic feet per hour. The carbonated product is filtered and the filtrate is found to have a sulfate ash content of 39.8% and a metal ratio of 9.3.

EXAMPLE 2

To a mixture of 3,245 grams (12.5 equivalents) of barium petroleum sulfonate, 1,460 grams (7.5 equivalents) of heptylphenol, and 2,100 grams of water in 8,045 grams of mineral oil there is added at 180° C. 7,400 grams (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5,695 grams of mineral oil and filtered. The filtrate is found to have a barium sulfate ash content of 30.5% and a metal ratio of 8.1. Another inert liquid such as benzene, toluene, heptene, etc., can be substituted for all or part of the mineral oil.

EXAMPLE 3

A mixture of 1,285 grams (1.0 equivalent) of 40% barium petroleum sulfonate and 500 milliliters (12.5 equivalents) of methanol is stirred at 55°-60° C. while 301 grams (3.9 equivalents) of barium oxide is added portionwise over a period of 1 hour. The mixture is stirred an additional 2 hours at 45°-55° C., then treated with carbon dioxide at 55°-65° C. for 2 hours. The resulting mixture is freed of methanol by heating to 150° C. The residue is filtered through a siliceous filter aid, the clear, brown filtrate analyzing as: sulfate ash, 33.2%; slightly acid; metal ratio, 4.7.

EXAMPLE 4

A stirred mixture of 57 grams (0.4 equivalents) of nonyl alcohol and 3.01 grams (3.9 equivalents) of barium oxide is heated at 150°-175° C. for an hour, then cooled to 80° C. whereupon 400 grams (12.5 equivalents) of methanol is added. The resultant mixture is stirred at 70°-75° C. for 30 minutes, then treated with 1,285 grams (1.0 equivalent) of 40% barium petroleum sulfonate. This mixture is stirred at reflux temperature for an hour, then treated with carbon dioxide at 60°-70° C. for 2 hours. The mixture is then heated to 160° C. at a pressure of 18 millimeters of mercury and thereafter filtered. The filtrate is a clear, brown oily material having the following analysis: sulfate ash, 32.5%; neutralization number—nil; metal ratio, 4.7.

EXAMPLE 5

(a) To a mixture of 1,145 grams of a mineral oil solution of a 40% solution of barium mahogany sulfonates (1.0 equivalent) and 100 grams of methyl alcohol at 55° C., there is added 220 grams of barium oxide while the mixture is being blown with carbon dioxide at a rate of 2 to 3 cubic feet per hour. To this mixture there is added an additional 78 grams of methyl alcohol and then 460 grams of barium oxide while the mixture is blown with carbon dioxide. The carbonated product is heated to 150° C. for 1 hour and filtered. The filtrate is found to have a barium sulfate ash content of 53.8% and a metal ratio of 8.9.

(b) A carbonated basic metal salt is prepared in accordance with the procedure of (a) except that a total of 16 equivalents of barium oxide is used per equivalent of the barium mahogany sulfonate. The product possesses a metal ratio of 13.4.

EXAMPLE 6

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1,305 grams of the above carbonated calcium sulfonate, 930 grams of mineral oil, 220 grams of methyl alcohol, 72 grams of isobutyl alcohol, and 38 grams of primary amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and filtered through a siliceous filter aid at this temperature. The filtrate has a calcium sulfate ash content of 39.5% and a metal ratio of 12.2.

EXAMPLE 7

A basic metal salt is prepared by the procedure described in Example 6 except that the slightly basic calcium sulfonate having a metal ratio of 2.5 is replaced with a mixture of that calcium sulfonate (280 parts by weight) and tall oil acid (970 parts by weight having an equivalent weight of 340) and that the total amount of calcium hydroxide used is 930 parts by weight. The resulting highly basic metal salt of the process has a calcium sulfate ash content of 48%, a metal ratio of 7.7, and an oil content of 31%.

EXAMPLE 8

A highly basic metal salt is prepared by the procedure of Example 7 except that the slightly basic calcium sulfonate starting material having a metal ratio of 2.5 is replaced with tall oil acids (1,250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

EXAMPLE 9

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90° to 100° C. to effect the conversion of the sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42°-43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

EXAMPLE 10

A mixture of 880 grams (0.968 moles) of a 57.5% oil solution of the calcium sulfonate of tridecylbenzene bottoms (the bottoms constitute a mixture of mono-, di-, and tri-decylbenzene), 149 grams of methanol, and 59 grams (1.58 equivalents) of calcium hydroxide are introduced into a reaction vessel and stirred vigorously. The whole is heated to 40°-45° C. and carbon dioxide is introduced for 0.5 hours at the rate of 2 cubic feet per hour. The carbonated reaction mixture is then heated to 150° C. to remove alcohol and any water present, and the residue is filtered for purposes of purification. The product, a 61% oil solution of the desired overbased carbonated calcium sulfonate material shows the following analysis: ash content, 16.8%; neutralization number, 7.0 (acidic); and metal ratio 2.42. By further carbonation in the presence of an alkali or alkaline earth metal oxide, hydroxide, or alkoxide, the metal ratio can readily be increased to 3.5 or greater.

EXAMPLE 11

A mixture of 2,090 grams (2.0 equivalents) of a 45% oil solution of calcium mahogany sulfonate containing 1% of water, 74 grams (2.0 equivalents) of calcium hydroxide, and 251 grams of ethylene glycol is heated for 1 hour at 100° C. Carbon dioxide is then bubbled through the mixture at 40°-45° C. for 5.5 hours. The ethylene glycol and any water present are removed by heating the mixture to a temperature of 185° C. at 10.2 millimeters of mercury. The residue is filtered yielding the desired overbased calcium sulfonate material, having the following analysis: sulfate ash, 12.9%, neutralization number 5.0 (acidic); and a metal ratio of 2.0 which can be increased to 3.5 or greater as desired by carbonation in the presence of calcium oxide or hydroxide.

EXAMPLE 12

A mixture comprising 1,595 parts of the overbased material of Example 9 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primaryamyl alcohols (containing about 65% normal amyl, 3% isoamyl and 32% of 2-methyl-1-butyl alcohols) is stirred vigorously at 40° C. and 25 parts of carbon dioxide is introduced over a period of 2 hours at 40°-50° C. Thereafter, three additional portions of calcium hydroxide, each amounting to 1.57 parts, are added and each such addition is followed by the introduction of carbon dioxide as previously illustrated. After the fourth calcium hydroxide addition and the carbonation step is completed, the reaction mass is carbonated for an additional hour at 43°-47° C. to reduce neutralization number of the mass to 4.0 (basic). The substantially neutral, carbonated reaction mixture is freed from alcohol and any water of reaction by heating to 150° C. and simultaneously blowing it with nitrogen. The residue in the reaction vessel is filtered. The filtrate, an oil solution of the desired substantially neutral, carbonated calcium sulfonate overbased material of high metal ratio, shows the following analysis: sulfate ash content, 41.11%; neutralization number 0.9 (basic); and a metal ratio of 12.55.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts or 5 moles) is added over a period of 1 hour at 80°-90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

EXAMPLE 13

A mixture of 574 grams (0.5 equivalents) of 40% barium petroleum sulfonate, 98 grams (1.0 equivalents) of furfuryl alcohol, and 762 grams of mineral oil is heated with stirring at 100° C. for an hour, then treated 1ortionwise over a 15-minute period with 230 grams (3.0 equivalents) of barium oxide. During this latter period, the temperature rises to 120° C. (because of the exothermic nature of the reaction of barium oxide and the alcohol). The mixture then is heated to 150°-160° C. for an hour, and treated subsequently at this temperature for 1.5 hours with carbon dioxide. The materialis concentrated by heating to a temperature of 150° C. at a pressure of 10 millimeters of mercury and thereafter filtered to yield a clear, oil-soluble filtrate having the following analysis: sulfate ash content, 21.4%; neutralization number, 2.6 (basic); and a metal ratio of 6.1.

EXAMPLE 14

An overbased material is prepared by the procedure of Example 6 except that the slightly basic calcium sulfonate starting material has a metal ratio of 1.6 and the amount of this calcium sulfonate used is 10.50 parts (by weight) and that the total amount of lime used is 630 parts. The resulting metal salt has a calcium sulfate ash content of 40%, a ratio of the inorganic metal group to the bivalent bridging group of 16, and an oil content of 35%.

EXAMPLE 15

To a mixture of 1614 parts (3 equivalents) of a polyisobutenyl succinic anhydride (prepared by the reaction of a chlorinated polyisobutene having an average chlorine content of 4.3% and an average of 67 carbon atoms with maleic anhydride at about 200° C.), 4313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hours while heating to 105° C. Isooctanol (75 parts) is added while the mixture is heated to 150° C. over a 1.5-hour period. The mixture is maintained at 150°-170° C. and blown with carbon dioxide at a rate of 4 cubic feet per hour for 3.5 hours. The reaction mixture is filtered through a filter aid and the filtrate is the desired product having a sulfate ash content of 18.9% and a metal ratio of 8.0.

EXAMPLE 16

The procedure of Example 6 is repeated except that an equivalent amount of sodium hydroxide is used in lieu of the calcium oxide. The product is the corresponding sodium overbased material.

EXAMPLE 17

A mixture of 244 parts (0.87 equivalent) of oleic acid, 180 parts of primary isooctanol, and 400 parts of mineral oil is heated to 70° C. whereupon 172.6 parts (2.7 equivalents) of cadmium oxide is added. The mixture is heated for 3 hours at a temperature of 150° to 160° C. while removing water. Barium hydroxide monohydrate (324 parts, 3.39 equivalents) is then added to the mixture over a period of 1 hour while continuing to remove water by means of a side-arm water trap. Carbon dioxide is blown through the mixture at a temperature of from 150°-160° C. until the mixture is slightly acidic to phenolphthalein. Upon completion of the carbonation, the mixture is stripped to a temperature of 150° C. at 35 mm. of mercury to remove substantially all the remaining water and alcohol. The residue is the desired overbased product containing both barium and cadmium metal.

EXAMPLE 18

The procedure of Example 13 is repeated except that the barium sulfonate is replaced by an equivalent amount of potassium sulfonate, and potassium oxide is used in lieu of the barium oxide resulting in the preparation of the corresponding potassium overbased material.

EXAMPLE 19

A sulfoxide is prepared by treating polyisobutylene (average molecular weight 750) with 47.5% of its weight of $SOCl_2$ for 4.5 hours at 220° C. A mixture of 787 grams (1.0 equivalent) of this sulfoxide, 124 grams (0.6 equivalent) of diisobutylphenol, 550 grams of mineral oil, and 200 grams of water was warmed to 70° C. and treated with 360 grams (4.0 equivalents) of barium oxide. This mixture is heated at reflux temperature for 1 hour and treated at 150° C. with carbon dioxide until the mixture is substantially neutral and thereafter filtered to yield a clear, oil-soluble liquid having the following analysis: sulfate ash, 22.8%; neutralization number, 5.8 (basic); and metal ratio, 5.8.

EXAMPLE 20

To a mixture of 268 grams (1.0 equivalent) of oleyl alcohol, 675 grams of mineral oil, 124 grams (0.6 equivalent) of diisobutylphenol, and 146 grams of water, at 70° C. there is added 308 grams (4.0 equivalents) of barium oxide. This mixture is heated at reflux temperature for 1 hour, then at 150° C. while bubbling carbon dioxide therethrough until substantial neutrality of the mixture is achieved. The resulting reaction mass is filtered resulting in a clear, brown, oil-soluble filtrate having the following analysis: sulfate ash content, 29.8%; neutralization number 2.6 (basic); and metal ratio, 6.0.

EXAMPLE 21

To a mixture of 423 grams (1.0 equivalent) of sperm oil, 124 grams (0.6 equivalent) of heptylphenol, 500 grams of mineral oil, and 150 grams of water there are added at 70° C. 308 grams (4.0 equivalents) of barium oxide. This mixture is heated at reflux temperature for 1 hour, dried by heating at about 150° C. and thereafter carbonated by treatment with carbon dioxide at the same temperature until the reaction mass was slightly acidic. Filtration yields a clear, light brown, non-viscous overbased liquid material having the following analysis: sulfate ash content, 32.0%; neutralization number 0.5 (basic); metal ratio, 6.5.

EXAMPLE 22

To a mixture of 174 grams (1.0 equivalent) of N-octadecyl propylene diamine, 124 grams (0.6 equivalent) of diisobutylphenol, 766 grams of mineral oil, 146 grams of water, there are added 306 grams (4.0 equivalents) of barium oxide and the whole is refluxed for an hour. Water is subsequently removed by raising the temperature to 150° C. and thereafter carbon dioxide is bubbled therethrough while maintaining this temperature. When the reaction mass is substantially neutral, carbon dioxide addition is ceased and the reaction mass filtered producing a clear, oil-soluble liquid having the following analysis: sulfate ash content, 28.9%; neutralization number, 2.5 (basic); metal ratio, 5.8.

EXAMPLE 23

A mixture of 6000 grams of a 30% solution of barium petroleum sulfonate (sulfate ash 7.6%), 348 grams of paratertiary butylphenol, and 2911 grams of water are heated to a temperature 60° C. while slowly adding 1100 grams of barium oxide and raising the temperature to 94°-98° C. The temperature is held within this range for about 1 hour and then slowly raised over a period of 7.5 hours to 150° C. and held at this level for an additional hour assuring substantial removal of all water. The resulting overbased material is a brown liquid having the following analysis: sulfate ash content, 26.0%; metal ratio, 4.35.

This product is then treated with $SO_2$ until 327 grams of the mass combined with the overbased material. The product thus obtained has a neutralization number of zero. The $SO_2$-treated material is liquid and brown in color.

One thousand grams of the $SO_2$-treated overbased material produced according to the preceding paragraph is mixed with 286 grams of water and heated to a temperature of about 60° C. Subsequently, 107.5 grams of barium oxide are added slowly and the temperature is maintained at 94°-98° C. for 1 hour. Then the total reaction mass is heated to 150° C. over a 1 1/16 hour period and held there for a period of 1 hour. The resulting overbased material is purified by filtration, the filtrate being the brown, liquid overbased material having the following analysis: sulfate ash content, 33.7%; basic number, 38.6; metal ratio, 6.3.

EXAMPLE 24

(a) A polyisobutylene having a molecular weight of 700-800 is prepared by the aluminum chloride-catalyzed polymerization of isobutylene at 0°-30° C., is nitrated with a 10% excess (1.1 moles) of 70% aqueous nitric acid at 70°-75° C. for 4 hours. The volatile components of the product mixture are removed by heating to 75° C. at a pressure of 75 mm. of mercury. To a mixture of 151 grams (0.19 equivalent) of this nitrated polyisobutylene, 113 grams (0.6 equivalent) of heptylphenol, 155 grams of water, and 2,057 grams of mineral oil there is added at 70° C. 612 grams (8 equivalents) of barium oxide. This mixture is heated at 150° C. for an hour, then treated with carbon dioxide at this same temperature until the mixture is neutral (phenolphthalein indicator; ASTM D-974-53T procedure at 25° C.; a measurement of the degree of conversion of the metal reactant, i.e., barium oxide, bicarbonation). The product mixture is filtered and filtrate found to have the following analysis: sulfate ash content, 27.6%; percent N, 0.06; and metal ratio, 9.

(b) A mixture of 611 grams (0.75 mole) of the nitrated polyisobutylene of Example 1, 96 grams (0.045 mole) of heptylphenol, 2104 grams of mineral oil, 188 grams of water and 736 grams (4.8 moles) of barium oxide was heated at reflux temperature for an hour. The water was vaporized and carbon dioxide passed into the mixture at 150° C. until the mixture was no longer basic. This carbonated mixture was filtered and the clear fluid filtrate showed the following analysis: sulfate ash content, 26.3%; percent N, 0.15; base No. 2.4; metal ratio 6.7.

EXAMPLE 25

(a) A mixture of 1 equivalent of a nitrated polypropylene having a molecular weight of about 3000, 2 equivalents of cetylphenol, mineral oil, and 3 equivalents of barium hydroxide is heated at reflux temperature for 1 hour. The temperature is then raised to 150° C. and carbon dioxide is bubbled through the mixture at this temperature. The reaction product is filtered and the filtrate is the desired overbased material.

(b) A solvent-refined, acid-treated Pennsylvania petroleum lubricating oil is nitrated by treatment with 1.5 moles of 70% aqueous nitric acid at 54°–78° C. for 8 hours. After removal of volatile components of the product mixture by heating at 103° C. at a pressure of 15 mm. of mercury for 2 hours, a 787 grams portion (1.0 N-equivalent) of the nitrated product is treated with 2 grams (0.3 equivalent) of heptylphenol, 495 grams of mineral oil, 90 grams of water, and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analysis: percent sulfate ash, 27.6; percent N, 0.5; and metal ratio, 3.1.

EXAMPLE 26

(a) A mixture of 1000 parts of mineral oil, 2 equivalents of barium hydroxide, 1 equivalent of 1-nitro-3-octadecyl-cyclohexane and 1 equivalent (i.e., 0.5 mole) of 4,4'-methylene-bis(heptylphenol) is carbonated at 100°–150° C. for 4 hours until the reaction mixture is substantially neutral to phenolphthalein indicator. The reaction mass is filtered and the desired product is the filtrate.

(b) A mixture of 1000 parts of mineral oil, 3 equivalents of lithium hydroxide, 1 equivalent of nitrated polyisobutene (prepared by mixing 500 parts by weight of polyisobutene having an average molecular weight of 1000 and 62.5 parts of 67% aqueous nitric acid at 65°–70° C. for 11 hours) and para-butylphenol (1 equivalent) is carbonated according to the technique of (a) above to produce the corresponding lithium overbased material.

EXAMPLE 27

A copolymer of isobutene and piperylene (weight ratio of 98:2) having a molecular weight of about 2000, is nitrated by the procedure used in the preceding example for the nitration of polyisobutene. An overbased product is then prepared from this nitrated reactant by mixing 1 equivalent thereof with 1 equivalent of alpha-butyl-beta-naphthol and 7 equivalents barium hydroxide, diluting the mixture with mineral oil to a 50% oil mixture, and then carbonating the mixture at 120°–160° C. until it is substantially neutral to phenolphthalein indicator. The reaction product is filtered and the filtrate is the desired overbased product.

EXAMPLE 28

A mixture of 630 grams (2 equivalents) of a rosin amine (consisting essentially of dehydroabietyl amine) having a nitrogen content of 44% and 245 grams (1.2 equivalents) of heptylphenol having a hydroxyl content of 8.3% is heated to 90° C. and thereafter mixed with 230 grams (3 equivalents) of barium oxide at 90°–140° C. The mixture is purged with nitrogen at 140° C. A 600 gram portion is diluted with 400 grams of mineral oil and filtered. The filtrate is blown with carbon dioxide, diluted with benzene, heated to remove the benzene, mixed with xylene, and filtered. The filtrate, a 20% xylene solution of the product has a barium sulfate ash content of 25.1%, a nitrogen content of 2%, and a reflux base number of 119. (The basicity of the metal composition is expressed in terms of milligrams of KOH which are equivalent to one gram of the composition.) For convenience, the basicity thus determined is referred to in the specification as a "reflux base number."

EXAMPLE 29

An amine-aldehyde condensation product is obtained as follows: formaldehyde (420 grams, 14 moles) is added in small increments to a mixture comprising N-octadecylpropylenediamine (1,392 grams, 4 moles), mineral oil (300 grams), water (200 grams), and calcium hydroxide (42 grams-condensation catalyst) at the reflux temperature, i.e., 100°–105° C. The rate of addition of formaldehyde is such as to avoid excessive foaming. The mixture is heated at reflux temperature for 1 hour, slowly heated to 155° C., and blown with nitrogen at 150°–155° C. for 2 hours to remove all volatile components. It is then filtered. The filtrate, 93% of the theoretical yield, is a 65.4% oil solution of the amine-aldehyde condensation product having a nitrogen content of 2.4%.

A 1,850 gram portion (3.2 equivalents of nitrogen) is mixed with 1,850 grams of heptylphenol (0.97 equivalent), 1,485 grams of mineral oil, and 1,060 grams of 90% pure barium oxide (12.6 equivalents) and heated to 70° C. Over a period of 1 hour, 500 grams of water is added while maintaining the temperature in the range of 70°–100° C. The mixture is heated at 110° to 115° C. for 4.7 hours and thereafter to 150° C. While maintaining the temperature within the range of 140°–150° C., the reaction mixture is carbonated and subsequently filtered. The filtrate is a 57.8% oil solution of the overbased amine-aldehyde condensation product having a nitrogen content of 0.87% and a barium sulfate ash content of 29.5%.

EXAMPLE 30

A partially acylated polyamine reactant is prepared as follows: a mixture (565 parts by weight) of an alkylene amine mixture consisting of triethylene tetramine and diethylene triamine in weight ratio of 3:1 is added at 20°–80° C. to a mixture of naphthenic acid having an acid number of 180 (1,270 parts) and oleic acid (1,110 parts). The total quantity of the two acids used is such as to provide 1 equivalent of acid for each two equivalents of the amine mixture used. The reaction is exothermic. The mixture is blown with nitrogen while it is being heated to 240° C. in 4.5 hours and thereafter heated at this temperature for 2 hours. Water is collected as the distillate.

To the above residue, ethylene oxide (140 parts) is added at 170°-180° C. within a period of 2 hours while nitrogen is bubbled through the reaction mixture. Nitrogen blowing is continued for an additional 15 minutes and the reaction mixture then diluted with 940 parts of xylene to a solution containing 25% by weight of xylene. The resulting solution has a nitrogen content of 5.4% and a base number of 82 at pH of 4, the latter being indicative of free amino groups.

A 789 gram portion of the above xylene solution (3 equivalents of nitrogen) is heated to 150° C. at a pressure of 2 millimeters of mercury to distill off xylene and is then mixed with 367 grams of heptylphenol (having a hydroxyl content of 8.3%; 1.8 equivalents). To this mixture there is added 345 grms (4.5 equivalents) of barium oxide in small increments at 90°-111° C. The mixture is heated at 90°-120° C. for 2.5 hours and blown with carbon dioxide for 1.75 hours. It is diluted with 130 grams of xylene and then heated at 150° C. for 3.5 hours. It is then diluted with 20% by weight of xylene and filtered. The filtrate has a barium sulfate ash content of 33.2%, a nitrogen content of 3.52% and a reflux base number of 134.

EXAMPLE 31

To a mixture of 408 grams (2 equivalents) of heptylphenol having a hydroxy content of 8.3% and 264 grams of xylene there is added 383 grams (5 equivalents) of barium oxide in small increments at 85°-110° C. Thereafter, 6 grams of water is added and the mixture is carbonated at 100°-130° C. and filtered. The filtrate is heated to 100° C. diluted with xylene to a 25% xylene solution. This solution has a barium sulfate ash content of 41% and a reflux base number of 137.

EXAMPLE 32

A mixture of 5,846 parts (4.0 equivalents) of a neutral calcium sulfonate having a calcium sulfate ash content of 4.68% (66% mineral oil), 464 parts (2.4 equivalents) of heptylphenol, and 3.4 parts of water is heated to 80° C. whereupon 1,480 parts (19.2 equivalents) of barium oxide is added over a period of 0.6 hour. The reaction is exothermic and the temperature of the reaction mixture reaches 100° C. The mixture is heated to 150° C. and carbonated at this temperature. During the carbonation, 24 parts of barium chloride were added to the mixture. Oil was removed from the reaction mixture during the carbonation procedure. Carbonation is continued at this temperature until the mixture has a base number (phenolphthalein) of 80. Octyl alcohol (164 parts) and a filter aid are added to the mixture and the mixture is filtered while hot. The filtrate is the desired overbased barium bright stock sulfonate having a barium sulfate ash content of 26.42, a metal ratio of 4.6 and a reflux base number of 104.

EXAMPLE 33

Following the procedure for preparing barium and calcium overbased sulfonates exemplified above, sodium mahogany sulfonate (0.26 equivalent), 1 equivalent of phenol, and 5.3 equivalents of strontium oxide are carbonated until the reaction mixture is almost neutral. The resulting overbased material is filtered, the filtrate being the desired product and having a metal ratio of 4.6.

EXAMPLE 34

A barium overbased carboxylic acid is prepared by carbonating a mixture of 9.8 equivalents of barium hydroxide, 1 equivalent of heptylphenol, and 0.81 equivalent of a polyisobutene substituted succinic anhydride wherein the polyisobutenyl portion thereof has an average molecular weight of 1,000.

EXAMPLE 35

A mixture of 1,000 parts by weight of a polyisobutene having a molecular weight of 1,000 and 90 parts of phosphorus pentasulfide is prepared at room temperature, heated to 260° C. over 5 hours, and maintained at this temperature for an additional 5 hours. The reaction mass is then cooled to 106° C. and hydrolyzd by treatment with steam at this temperature for 5 hours. The hydrolyzed acid has a phosphorus conteent of 2.4%, a sulfur content of 2.8%. In a separate vessel, a mixture of oil and barium hydroxide is prepared by mixing 2,200 parts of a mineral oil and 1,150 parts of barium oxide at 88° C. and blowing the mixture with steam for 3 hours at 150° C. To this mixture there is added portionwise throughout a period of 3 hours, 1,060 parts of the above hydrolyzed acid while maintaining the temperature at 145°-150° C., and then 360 parts of heptylphenol is added over a 1.5 hour period. The resulting mixture is blown with carbon dioxide at the rate of 100 parts per hour for 3 hours at 150°-157° C. The carbonated product is mixed with 850 parts of a mineral oil and dried by blowing it with nitrogen at a temperature of 150° C. The dry product is filtered and the filtrate is diluted with mineral oil to a solution having a barium sulfate ash content of 25%. The final solution has a phosphorus content of 0.48%, a neutralization number less than 5 (basic), a reflux base number of 109, and a metal ratio of 7.2

EXAMPLE 36

(a) To a mixture of 268 grams (1.0 equivalent) of oleyl alcohol, 124 grams (0.6 equivalent) of heptylphenol, 988 grams of mineral oil, and 160 grams of water there is added 168 grams (4.0 equivalents) of lithium hydroxide monohydrate. The mixture is heated at reflux temperature for an hour and then carbonated at 150° C. until it is substantially neutral. The filtration of this carbonated mixture yields a liquid having a lithium sulfate content of 12.7%.

(b) To a mixture of 1,614 parts (3 equivalents) of a polyisobutenyl succinic anhydride prepared by the reaction of a chlorinated polyisobutene having an average chlorine content of 4.3% and an average of 67 carbon atoms with maleic anhydride at about 200° C., 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. in about 1.5 hours. The mixture is maintained at 150°-170° C. and blown with carbon dioxide at the rate of 4 cubic feet per hour for 3.5 hours. The reaction mixture is filtered through a filter aid and the filtrate is the desired product having a sulfate ash content of 18.9 and a metal ratio of 8.

EXAMPLE 37

A thiophosphorus acid is prepared as set forth in Example 35 above. A mixture of 890 grams of this acid (0.89 equivalent), 2,945 grams of mineral oil, 445 grams of heptylphenol (2.32 equivalents), and 874 grams of lithium hydroxide monohydrate (20.8 equivalents) formed by adding the metal base to the mineral oil solution of the acid and the heptylphenol over a 1.5 hour period maintaining the temperature at 100°–110° C. and thereafter drying at 150° C. for 2 hours, carbon dioxide is bubbled therethrough at the rate of 4 cubic feet per hour until the reaction mixture was slightly acidic to phenolphthalein, about 3.5 hours, while maintaining the temperature within the range of 150°–160° C. The reaction mixture is then filtered twice through a diatomaceous earth filter. The filtrate is the desired lithium overbased thio-phosphorus acid material having a metal ratio of 6.3.

EXAMPLE 38

(a) A reaction mixture comprising 2,442 grms (2.8 equivalents) of strontium petrosulfonate, 3,117 grams of mineral oil, 150 grams of isooctanol, and 910 grams of methanol is heated to 55° C. and thereafter 615 grams of strontium oxide (11.95 equivalents) is added over a 10 minute period while maintaining the reaction at a temperature of 55°–65° C. The mixture is heated an additional hour at this same temperature range and thereafter blown with carbon dioxide at a rate of 4 cubic feet per hour for about 3 hours until the reaction mixture was slightly acidic to phenolphthalein. Thereafter, the reaction mixture is heated to 160° C. and held there for about 1 hour while blowing the nitrogen at 5 cubic feet per hour. Thereafter, the product is filtered, the filtrate being the desired overbased material having a metal ratio of 3.8.

(b) To a mixture of 3,800 parts (4 equivalents) of a 50% mineral oil solution of lithium petroleum sulfonate (sulfate ash of 6.27%), 460 parts (2.4 equivalents) of heptylphenol, 1,920 parts of mineral oil, and 300 parts of water, there is added at 70° C. 1,216 parts (28.9 equivalents) of lithium hydroxide monohydrate over a period of 0.25 hour. This mixture is stirred at 110° C. for 1 hour, heated to 150° C. over a 2.5 hour period, and blown with carbon dioxide at the rate of 4 cubic feet per hour over a period of about 3.5 hours until the reaction mixture is substantially neutral. The mixture is filtered and the filtrate is the desired product having a sulfate ash content of 25.23% and a metal ratio of 7.2.

EXAMPLE 39

A mixture of alkylated benzene sulfonic acids and naphtha is prepared by adding 1,000 grams of a mineral oil solution of the acid containing 18% by weight mineral oil (1.44 equivalents of acid) and 222 grams of naphtha. While stirring the mixture, 3 grams of calcium chloride dissolved in 90 grams of water and 53 grams of Mississippi lime (calcium hydroxide) is added. This mixture is heated to 97°–99° C. and held at this temperature for 0.5 hour. Then 80 grams of Mississippi lime are added to the reaction mixture with stirring and nitrogen gas is bubbled therethrough to remove water, while heating to 150° C. over a 3 hour period. The reaction mixture is then cooled to 50° C. and 170 grams of methanol are added. The resulting mixture is blown with carbon dioxide at the rate of 2 cubic feet per hour until substantially neutral. The carbon dioxide blowing is discontinued and the water and methanol stripped from the reaction mixture by heating and bubbling nitrogen gas therethrough. While heating to remove the water and methanol, the temperature rose to 146° C. over a 1.75 hour period. At this point the metal ratio of the overbased material was 2.5 and the product is a clear, dark brown viscous liquid. This material is permitted to cool to 50° C. and thereafter 1,256 grams thereof is mixed with 574 grams of naphtha, 222 grams of methanol, 496 grams of Mississippi lime, and 111 grams of an equal molar mixture of isobutanol and amyl alcohol. The mixture is thoroughly stirred and carbon dioxide is blown therethrough at the rate of 2 cubic feet per hour for 0.5 hour. An additional 124 grams of Mississippi lime is added to the mixture with stirring and the $CO_2$ blowing continued. Two additional 124 grain increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25 hour period while blowing with nitrogen to remove water and methanol from the mixture. Thereafter, the mixture is permitted to cool to room temperature and filtered producing 1,895 grams of the desired overbased material having a metal ratio of 11.3. The material contains 6.8% mineral oil, 4.18% of the isobutanol-amyl alcohol and 30.1% naphtha.

EXAMPLE 40

A mixture of 406 grams of naphtha and 214 grams of amyl alcohol is placed in a three-liter flask equipped with reflux condenser, gas inlet tubes, and stirrer. The mixture is stirred rapidly while heating to 38° C. and adding 27 grams of barium oxide. Then 27 grams of water are added slowly and the temperature rises to 45° C. Stirring is maintained while slowly adding over 0.25 hours 73 grams of oleic acid. The mixture is heated to 95° C. with continued mixing. Heating is discontinued and 523 grams of barium oxide are slowly added to the mixture. The temperature rises to about 115° C. and the mixture is permitted to cool to 90° C. whereupon 67 grams of water are slowly added to the mixture and the temperature rises to 107° C. The mixture is then heated within the range of 107°–120° C. to remove water over a 3.3 hour period while bubbling nitrogen through the mass. Subsequently, 427 grans of oleic acid is added over a 1.3 hour period while maintaining a temperature of 120°–125° C. Thereafter heating is terminated and 236 grms of naphtha is added. Carbonation is commenced by bubbling carbon dioxide through the mass at two cubic feet per hour for 1.5 hours during which the temperature is held at 108°–117° C. The mixture is heated under a nitrogen purge to remove water. The reaction mixture is filtered twice producing a filtrate analyzing as follows: sulfate ash content, 34.42%; metal ratio, 313. The filtrate contains 10.7% amyl alcohol and 32% naphtha.

EXAMPLE 41

A reaction mixture comprising 1,800 grams of a calcium overbased petrosulfonic acid containing 21.7% by weight mineral oil, 36.14% by weight naphtha, 426 grams naphtha, 255 grams of methanol, and 127 grams of an equal molar amount of isobutanol and amyl alcohol are heated to 45° C. under reflux conditions and 148 grams of Mississippi lime (commercial calcium hydroxide) is added thereto. The reaction mass is then blown with carbon dioxide at the rate of 2 cubic feet per hour and thereafter 148 grams of additional Mississippi lime added. Carbonation is continued for another hour at the same rate. Two additional 147 gram increments of Mississippi lime are added to the reaction mixture, each increment followed by about a 1 hour carbonation process. Thereafter, the reaction mass is heated to a temperature of 138° C. while bubbling nitrogen therethrough to remove water and methanol. After filtration, 2,220 grams of a solution of the barium overbased petrosulfonic acid is obtained having a metal ratio of 12.2 and containing 12.5% by weight mineral oil, 34.15% by weight naphtha, and 4.03% by weight of the isobutanol amyl alcohol mixture.

EXAMPLE 42

(a) Following the procedure of Example 2 above, the corresponding lead product is prepared by replacing the barium petrosulfonate with lead petroleum sulfonate (1 equivalent) and barium oxide with lead oxide (25 equivalents).

(b) Following the procedure of Example 5(a) above, the corresponding overbased sodium sulfonate is prepared by replacing the barium oxide with sodium hydroxide.

EXAMPLE 43

A mixture of 1000 parts of a 60% mineral oil solution of sodium petroleum sulfonate (having a sulfated ash content of about 8.5%) and a solution of 71.3 parts of 96% calcium chloride in 84 parts of water is mixed at 100° C. for 0.25 hour. Then 67 parts of hydrated lime is added and the whole is heated at 100° C. for 0.25 hour then dried by heating to 145° C. to remove water. The residue is cooled and adjusted to 0.7% water content. One-hundred thirty parts methanol is added and the whole is blown with carbon dioxide at 45°-50° C. until it is substantially neutral. Water and alcohol are removed by heating the mass to 150° C. and the resulting oil solution is filtered. The resulting product is carbonated calcium sulfonate overbased material containing 4.78% calcium and a metal ratio of 2.5.

A mixture of 1000 parts of the above carbonated calcium sulfonate overbased material, 316 parts of mineral oil, 176 parts of methanol, 58 parts of isobutyl alcohol, 30 parts of primary amyl alcohol and 52.6 parts of the calcium phenate of Example 12 is prepared, heated to 35° C., and subjected to the following operating cycle four times: mixing with 93.6 parts of 97.3% calcium hydroxide and treating the mixture with carbon dioxide until it has a base number of 35-45. The resulting product is heated to 150° C. and simultaneously blown with nitrogen to remove alcohol and water, and then filtered. The filtrate has a calcium content of 12.0% and a metal ratio of 12.

Examples 1-43 illustrate various means for preparing overbased materials suitable for use in the aqueous compositions of the invention or for conversion to the non-Newtonian colloidal disperse systems utilized in the present invention. Obviously, it is within the skill of the art to vary these examples to produce any desired overbased material. Thus, other acidic materials such as mentioned herebefore can be substituted for the $CO_2$, $SO_2$, and acetic acid used in the above examples. Similarly, other metal bases can be employed in lieu of the metal base used in any given example. Or mixtures of bases and/or mixtures of materials which can be overbased can be utilized. Similarly, the amount of mineral oil or other non-polar, inert, organic liquid used as the overbasing medium can be varied widely both during overbasing and in the overbased product.

Examples 44-84 illustratee the conversion of the Newtonian overbased materials (i.e., component (B)(I)) into non-Newtonian colloidal disperse systems (i.e., component (B)(II)) by homogenization with conversion agents.

EXAMPLE 44

To 733 grams of the overbased material of Example 5(a) there is added 179 grams of acetic acid and 275 grams of a mineral oil (having a viscosity of 2000 SUS at 1000° F.) at 90° C. in 1.5 hours with vigorous agitation. The mixture is then homogenized at 150° C. for 2 hours and the resulting material is the desired colloidal disperse system.

EXAMPLE 45

A mixture of 960 grams of the overbased material of Example 5(b), 256 grams of acetic acid, and 300 grams of a mineral oil (having a viscosity of 2000 SUS at 100° C.) is homogenized by vigorous stirring at 150° C. for 2 hours. The resulting product is a non-Newtonian colloidal disperse system of the type contemplated for use by the present invention.

The overbased material of Examples 44 and 45 can be converted without the addition of additional mineral oil or if another inert organic liquid is substituted for the mineral oil.

EXAMPLE 46

A mixture of 150 parts of the overbased material of Example 6, 15 parts of methyl alcohol, 10.5 parts of amyl alcohol, and 45 parts of water is heated under reflux conditions at 71°-74° C. for 13 hours whereupon the mixture gels. The gel is heated for 6 hours at 144° C., diluted with 126 parts of the mineral oil of the type used in Example 43 above, the diluted mixture heated to 144° C. for an additional 4.5 hours. The resulting thickened product is a colloidal disperse system. Again, it is not necessary that the material be diluted with mineral oil in order to be useful. The gel itself which results from the initial homogenization of the overbased material and the lower alkanol mixture is a particularly useful colloidal disperse system for incorporating into resinous compositions.

EXAMPLE 47

A mixture of 1,000 grams of the product of Example 12, 80 grams of methanol, 40 grams of mixed primary amyl alcohols (containing about 65% by weight of normal amyl alcohol, 3% by weight of isoamyl alcohol, and 32% by weight of 2-methyl-1-butyl alcohol) and 80 grams of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green gel, which is a particularly useful colloidal disperse system.

EXAMPLE 48

The procedure of Example 47 is repeated except that 120 grams of water is used to replace the water-alkanol mixture employed as the conversion agent therein. Conversion of the Newtonian overbased material into the non-Newtonian colloidal disperse system requires about 5 hours of homogenization. The disperse system is in the form of a gel.

EXAMPLE 49

To 600 parts by weight of the overbased material of Example 6, there is added 300 parts of dioctylphthalate, 48 parts of methanol, 36 parts of isopropyl alcohol, and 36 parts of water. The mixture is heated to 70°–77° C. and maintained at this temperature for 4 hours during which the mixture becomes more viscous. The viscous solution is then blown with carbon dioxide for 1 hour until substantially to phenolphthalein. The alcohols and water are removed by heating to approximately 150° C. The residue is the desired colloidal disperse system.

EXAMPLE 50

To 800 parts of the overbased material of Example 6, there is added 300 parts of kerosene, 120 parts of an alcohol:water mixture comprising 64 parts of methanol, 32 parts of water and 32 parts of the primary amyl alcohol mixture of Example 46. The mixture is heated to 75° C. and maintained at this temperature for 2 hours during which time the viscosity of the mixture increases. The water and alcohols are removed by heating the mixture to about 150° C. while blowing with nitrogen for 1 hour. The residue is the desired colloidal disperse system having the consistency of a gel.

EXAMPLE 51

A mixture of 340 parts of the product of Example 6, 68 parts of a alcohol:water solution consisting of 27.2 parts of methanol, 20.4 parts of isopropyl alcohol and 20.4 parts of water, and 170 parts of heptane is heated to 65° C. During this period, the viscosity of the mixture increases from an initial value of 6,250 to 54,000.

The thickened colloidal disperse system is further neutralized by blowing the carbon dioxide at the rate of 5 lbs per hour for 1 hour. The resulting mass is found to have a neutralization number of 0.87 (acid to phenolphthalein indicator).

EXAMPLE 52

The procedure of Example 51 is repeated except that the calcium overbased material of Example 6 is replaced by an equivalent amount of the cadmium and barium overbased material of Example 17. Xylene (200 parts) is used in lieu of the heptane and the further carbonation step is omitted.

EXAMPLE 53

A mixture of 500 parts of the overbased material of Example 6, 312 parts of kerosene, 40 parts of methylethyl ketone, 20 parts of isopropyl alcohol, and 50 parts of water is prepared and heated to 75° C. The mixture is maintained at a temperature of 70°–75° C. for 5 hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

EXAMPLE 54

A mixture of 500 parts of the product of Example 6, 312 parts of kerosene, 40 parts of acetone, and 60 parts of water is heated to reflux and maintained at this temperature for 5 hours with stirring. The temperature of the material is then raised to about 155° C. while removing the volatile components. The residue is viscous gel-like material which is the desired colloidal disperse system.

EXAMPLE 55

The procedure of Example 54 is repeated with the substitution of 312 parts of heptane for the kerosene and 60 parts of water for the acetone-water mixture therein. At the completion of the homogenization, hydrogen gas is bubbled through the gel to facilitate the removal of water and any other volatile components.

EXAMPLE 56

To 500 parts of the overbased material of Example 9, there is added 312 parts of kerosene, 40 parts of o-cresol, and 50 parts of water. This mixture is heated to the reflux temperature (70°–75° C.) and maintained at this temperature for 5 hours. The volatile components are then removed from the mixture by heating to 150° C. over a period of 2 hours. The residue is the desired colloidal disperse system containing about 16% by weight of kerosene.

EXAMPLE 57

A mixture of 500 parts of the overbased material of Example 5(a) and 312 parts of heptane is heated to 80° C. whereupon 149 parts of glacial acetic acid (99.8% by weight) is added dropwise over a period of 5 hours. The mixture is then heated to 150° C. to remove the volatile components. The resulting gel-like material is the desired colloidal disperse system.

EXAMPLE 58

The procedure of Example 57 is repeated except that 232 parts of boric acid is used in lieu of the acetic acid. The desired gel is produced.

EXAMPLE 59

The procedure of Example 55 is repeated except that the water is replaced by 40 parts of methanol and 40 parts of diethylene triamine. Upon completion of the homogenization, a gel-like collidal disperse system is produced.

EXAMPLE 60

A mixture of 500 parts of the product of Example 6 and 300 parts of heptane is heated to 80° C. and 68 parts of anthranilic acid is added over a period of 1 hour while maintaining the reaction temperature between 80° and 95° C. The reaction mixture is then heated to 150° C. over a 2 hour period and then blown with nitrogen for 15 minutes to remove the volatile components. The resulting colloidal disperse system is a moderately stiff gel.

EXAMPLE 61

The procedure of Example 60 is repeated except that the anthranilic acid is replaced by 87 parts of adipic acid. The resulting product is very viscous and is the desired colloidal disperse system. This gel can be diluted, if desired, with mineral oil or any of the other materials said to be suitable for disperse mediums hereinabove.

EXAMPLE 62

A mixture of 500 parts of the product of Example 8 and 300 parts of heptane is heated to 80° C. whereupon 148 parts of glacial acetic acid is added over a period of 1 hour while maintaining the temperature within the range of about 80°-88° C. The mixture is then heated to 150° C. to remove the volatile components. The residue is a viscous gel which is useful for incorporation into the polymeric resins of the present invention. It may also be diluted with a material suitable as a disperse medium to facilitate incorporation into resinous compositions.

EXAMPLE 63

A mixture of 300 parts of toluene and 500 parts of an overbased material prepared according to the procedure of Example 7 and having a sulfate ash content of 41.8% is heated to 80° C. whereupon 124 parts of glacial acetic acid is added over a period of 1 hour. The mixture is then heated to 175° C. to remove the volatile components. During this heating, the reaction mixture becomes very viscous and 380 parts of mineral oil is added to facilitate the removal of the volatile components. The resulting colloidal disperse system is a very viscous grease-like material.

EXAMPLE 64

A mixture of 700 parts of the overbased material of Example 5(b), 70 parts of water, and 350 parts of toluene is heated to reflux and blown with carbon dioxide at the rate of 1 cubic foot per hour for 1 hour. The reaction product is a soft gel.

EXAMPLE 65

The procedure of Example 61 is repeated except that the adipic acid is replaced by 450 grams of di(4-methylamyl) phosphorodithioic acid. The resulting material is a gel.

EXAMPLE 66

The procedure of Example 59 is repeated except that the methanol-amine mixture is replaced by 250 parts of a phosphorus acid obtained by treating with steam at 150° C. the product obtained by reacting 1000 parts of polyisobutene having a molecular weight of about 60,000, with 24 parts of phosphorus pentasulfide. The product is a viscous brown gel-like colloidal disperse system.

EXAMPLE 67

The procedure of Example 63 is repeated except that the overbased material therein is replaced by an equivalent amount of the potassium overbased material of Example 18 and the heptane is replaced by an equivalent amount of toluene.

EXAMPLE 68

The overbased material of Example 6 is isolated as a dry powder by precipitation out of a benzene solution through the addition thereto of acetone. The precipitate is washed with acetone and dried.

A mixture of 45 parts of a toluene solution of the above powder (364 parts of toluene added to 500 parts of the powder to produce a solution having a sulfate ash content of 43%), 36 parts of methanol, 27 parts of water, and 18 parts of mixed isomeric primary amyl alcohols (described in Example 47) is heated to a temperature within the range of 70°-75° C. The mixture is maintained at this temperature for 2.5 hours and then heated to remove the alkanols. The resulting material is a colloidal disperse system substantially free from any mineral oil. If desired, the toluene present in the colloidal disperse system at the disperse medium can be removed by first diluting the disperse system with mineral oil and thereafter heating the diluted mixture to a temperature of about 160° C. whereupon the toluene is vaporized.

EXAMPLE 69

Calcium overbased material similar to that prepared in Example 6 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example 47, and 6 parts of water. The reaction mass is mixed for 6 hours while maintaining the temperature at 75°-78° C. Thereafter, the disperse system is heated to remove the alkanols and water. If desired, the gel can be diluted by the addition of mineral oil, toluene, xylene, or any other suitable disperse medium.

EXAMPLE 70

A solution of 1,000 grams of the gel-like colloidal disperse system of Example 46 is dissolved in 1,000 grams of toluene by continuous agitation of these two components for about 3 hours. A mixture of 1,000 grams of the resulting solution, 20 grams of water, and 20 grams of methanol are added to a 3-liter flask. Thereafter, 92.5 grams of calcium hydroxide is slowly added to the flask with stirring. An exothermic reaction takes place raising the temperature to 32° C. The entire reaction mass is then heated to about 60° C. over a 0.25 hour period. The heated mass is then blown with carbon dioxide at the rate of 3 standard cubic feet per hour for 1 hour while maintaining the temperature at 60°-70° C. At the conclusion of the carbonation, the mass is heated to about 150° C. over a 0.75 hour period to remove water, methanol, and toluene. The resulting product is a clear, light brown colloidal disperse system in the form of a gel. In this manner additional metal-containing particles are incorporated into the colloidal disperse system.

At the conclusion of the carbonation step and prior to removing the water, methanol, and toluene, more calcium hydroxide could have been added to the mixture and the carbonation step repeated in order to add still additional metal-containing particles to the colloidal disperse system.

EXAMPLE 71

A mixture of 1200 grams of the gel produced according to Example 46, 600 grams of toluene, and 48 grams of water is blown with carbon dioxide at 2 standard cubic feet per hour while maintaining the temperature at 55°-65° C. for 1 hour. The carbonated reaction mass is then heated at 150° C. for 1.75 hours to remove the water and toluene. This procedure improves the texture of the colloidal disperse systems and converts any calcium oxide or calcium hydroxide present in the gel produced according to Example 45 into calcium carbonate particles.

EXAMPLE 72

A mixture comprising 300 grams of water, 70 grams of the amyl alcohol mixture identified in Example 47 above, 100 grams of methanol, and 1000 grams of a barium overbased oleic acid, prepared according to the general technique of Example 3 by substituting oleic acid for the petrosulfonic acid used therein, and having a metal ratio of about 3.5 is thoroughly mixed for about 2.5 hours while maintaining the temperature within the range of from about 72°–74° C. At this point the resulting colloidal disperse system is in the form of a very soft gel. This material is then heated to about 150° C. for a 2 hour period to expel methanol, the amyl alcohols, and water. Upon removal of these liquids, the colloidal disperse system is a moderately stiff, gel-like material.

EXAMPLE 73

A dark brown colloidal disperse system in the form of a very stiff gel is prepared from the product of Example 39 using a mixture of 64 grams of methanol and 80 grams of water as the conversion agent to convert 800 grams of the overbased material. After the conversion process, the resulting disperse system is heated to about 150° C. to remove the alcohol and water.

EXAMPLE 74

1000 grams of the overbased material of Example 40 is converted to a colloidal disperse system by using as a conversion agent a mixture of 100 grams of methanol and 300 grams of water. The mixture is stirred for 7 hours at a temperature within the range of 72°–80° C. At the conclusion of the mixing, the resulting mass is heated gradually to a temperature of about 150° C. over a 3 hour period to remove all volatile liquid contained therein. Upon removal of all volatile solvents, a tan powder is obtained. By thoroughly mixing this tan powder to a suitable orgaic liquid such as naphtha, it is again transformed into a colloidal disperse system.

EXAMPLE 75

A mixture of 1000 grams of the product of Example 41, 100 grams of water, 80 grams of methanol, and 300 grams of naphtha are mixed and heated to 72° C. under reflux conditions for about 5 hours. A light brown viscous liquid material is formed which is the desired colloidal disperse system. This liquid is removed and consists of the colloidal disperse system wherein about 11.8% of the disperse medium is mineral oil and 88% is naphtha.

Following the techniques of Example 46 additional overbased materials as indicated below are converted to the corresponding colloidal disperse systems.

| Example No. | Overbased material converted to colloidal disperse system |
|---|---|
| 76 | Example 15 |
| 77 | Example 21 |
| 78 | Example 23 |
| 79 | Example 24(a) |
| 80 | Example 28 |
| 81 | Example 31 |
| 82 | Example 39 |
| 83 | Example 40 |

EXAMPLE 84

A mixture of 1000 parts of the overbased material of Example 43 and 388.4 parts of mineral oil is heated to 55°–60° C. and blown with carbon dioxide until the base number is about one. 56.5 parts methanol and 43.5 parts water are added and the whole is mixed at 75°–80° C. under reflux until the viscosity increases to a maximum. The maximum viscosity can be determined by visual inspection. 472.5 parts of 97.3% calcium hydroxide and 675.4 parts of mineral oil are added and the whole is blown with carbon dioxide at a temperature of 75°–80° C. until the whole is substantially neutral. Alcohol and water are removed by blowing the whole with nitrogen at 150° C. The resulting product has a calcium content of 13.75% and a metal ratio of 36.

The change in rheological properties associated with conversion of a Newtonian overbased material into a non-Newtonian colloidal disperse system is demonstrated by the Brookfield Viscometer data derived from overbased materials and colloidal disperse systems prepared therefrom. In the following samples, the overbased material and the colloidal disperse systems are prepared according to the above-discussed and exemplified techniques. In each case, after preparation of the overbased material and the colloidal disperse system, each is blended with dioctylphthalate (DOP) so that the compositions tested in the viscometer contain 33.3% by weight DOP (Samples A, B, and C) or 50% by weight DOP (Sample D). In Samples A-C, the acidic material used in preparing the overbased material is carbon dioxide while in Sample D, acetic acid is used. The samples each are identified by two numbers, (1) and (2). The first is the overbased material-DOP composition and the second the colloidal disperse system-DOP composition. The overbased materials of the samples are further characterized as follows:

SAMPLE A

Calcium overbased petrosulfonic acid having a metal ratio of about 12.2.

SAMPLE B

Barium overbased oleic acid having a metal ratio of about 3.5

SAMPLE C

Barium overbased petrosulfonic acid having a metal ratio of about 2.5.

SAMPLE D

Calcium overbased commercial higher fatty acid mixture having a metal ratio of about 5.

The Brookfield Viscometer data for these compositions is tabulated below. The data of all samples is collected at 25° C.

| BROOKFIELD VISCOMETER DATA (Centipoises) | | | | | | | | |
|---|---|---|---|---|---|---|---|---|
| | Sample A | | Sample B | | Sample C | | Sample D | |
| R.p.m. | (1) | (2) | (1) | (2) | (1) | (2) | (1) | (2) |
| 6 | 230 | 2,620 | 80 | 15,240 | 240 | 11,320 | 114 | 8,820 |
| 12 | 235 | 2,053 | 90 | 8,530 | 230 | 6,980 | 103 | 5,220 |
| 30 | 239 | 1 | 88 | 1 | 224 | 4,008 | 100 | 2,892 |

[1]Off scale.

The Nitrogen-Containing, Phosphorus Free Carboxyl Solubilizer, (C):

Component (C)(I):

The acylating agent (C)(I) used in making the solubilizers (C) of the present invention are well known to those of skill in the art and have been found to be useful as additives for lubricants and fuels and as intermediates for preparing the same. See, for example, the following U.S. Patents which are hereby incorporated by reference for their disclosures relating to carboxylic acid acylating agents: U.S. Pat. Nos. 3,219,666; 3,272,746; 3,381,002; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Often they are polycarboxylic acylating agents such as hydrocarbyl-substituted succinic acids and anhydrides. These acylating agents have at least one hydrocarbon-based substituent of about 12 to about 500 carbon atoms. Generally, this substituent has an average in the range of about 20, typically 30, and often about 50 carbon atoms, up to about 500 carbon atoms, often 300 carbon atoms or 250 carbon atoms.

As used herein, the terms "hydrocarbon-based", "hydrocarbon-based substituent" and the like denote a substituent having a carbon atom directly attached to the remainder of the molecule and having predominantly hydrocarbyl character within the context of this invention. Such substituents include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic nuclei and the like as well as cyclic substituents wherein the ring is completed through another portion of the molecule (that is, any two indicated substituents may together form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radicals (e.g., halo (especially chloro and fluoro)), alkoxyl, mercapto, alkylmercapto, nitro, nitroso, sulfoxy, etc.;

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbyl.

In general, the hydrocarbon-based substituents present in the acylating agents used in this invention are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

As noted above, the hydrocarbon-based substituents present in the acylating agents of this invention may be derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)-phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about two to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon-based substituents are derived include ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3, isoprene, hexadiene-1,5, 2-chlorobutadiene-1,3, 2-methylheptene-1, 3-cyclohexylbutene-1, 3,3-dimethylpentene-1, styrenedivinylbenzene, vinylacetate allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s such as obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These polyisobutenes contain predominantly (that is, greater than 80% of the total repeat units) isobutene repeat units of the configuration

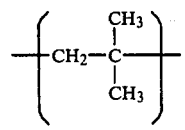

Typically, the hydrocarbyl-based substituent in the carboxylic acid acylating agent as used in the present invention is a hydrocarbyl, alkyl or alkenyl group of about 12 to about 500 carbon atoms which can be represented by the indicia "hyd". Useful acylating agents include substituted succinic acid agents containing hydrocarbyl-based substituents of about 30–500 carbon atoms.

Often the agents (C)(I) used in making the solubilizers (C) are substituted succinic acids or derivatives thereof which can be represented by the formula:

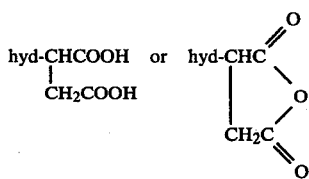

Such succinic acid acylating agents can be made by the reaction of maleic anhydride, maleic acid, or fumaric acid with the afore-described olefin polymer, as is shown in the patents cited above relating to carboxylic acid acylating agents. Generally, the reaction involves merely heating the two reactants at a temperature of about 150° to about 200°. Mixtures of the afore-said polymeric olefins, as well as mixtures of unsaturated mono- and dicarboxylic acids can also be used.

Component (C)(II):

The hydroxyl hydrocarbyl amines (C)(II) of the present invention generally have one to about four, typically one to about two hydroxyl groups per molecule. These hydroxyl groups are each bonded to a hydrocarbyl group to form a hydroxyl-substituted hydrocarbyl group which, in turn, is bonded to the amine portion of the molecule. These N-(hydroxyl-substituted hydrocarbyl) amines can be monoamines or polyamines and they can have a total of up to about 40 carbon atoms; generally they have a total of about 20 carbon atoms. Typically, however, they are monoamines containing but a single hydroxyl group. These amines can be primary, secondary or tertiary amines while the N-(hydroxyl-substituted hydrocarbyl) polyamines can have one or more of any of these types of amino groups. Mixtures of two or more of any of the afore-described amines (C)(II) can also be used to make the carboxylic solubilizer (C).

Specific examples N-(hydroxyl-substituted hydrocarbyl)amines suitable for use in this invention are the N-(hydroxy-lower alkyl)amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri-(2-hydroxyethyl)ethylenediamine, N,N,N',N'-tetra(2-hydroxyethyl)ethylenediamine, N-(2-hydroxyethyl)piperazine, N,N'-di-(3-hydroxypropyl)piperazine, N-(2-hydroxyethyl)morpholine, N-(2-hydroxyethyl)-2-morpholinone, N-(2-hydroxyethyl)-3-methyl-2-morpholinone, N-(2-hydroxypropyl)-6-methyl-2-morpholinone, N-(2-hydroxyethyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl)piperidine, N-(4-hydroxybutyl)piperidine, N,N-di(2-hydroxyethyl)glycine, and ethers thereof with aliphatic alcohols, especially lower alkanols, N,N-di(3-hydroxypropyl)glycine, and the like.

Further amino alcohols are the hydroxy-substituted primary amines described in U.S. Pat. No. 3,576,743 by the general formula $$R_a-NH_2$$

where $R_a$ is a monovalent organic radical containing at least one alcoholic hydroxy group, according to this patent, the total number of carbon atoms in $R_a$ will not exceed about 20. Hydroxy-substituted aliphatic primary amines containing a total of up to about 10 carbon atoms are useful. Generally useful are the polyhydroxy-substituted alkanol primary amines wherein there is only one amino group present (i.e., a primary amino group) having one alkyl substituent containing up to 10 carbon atoms and up to 4 hydroxyl groups. These alkanol primary amines correspond to $R_aNH_2$ wherein $R_a$ is a mono- or polyhydroxy-substituted alkyl group. It is typical that at least one of the hydroxyl groups be a primary alcoholic hydroxyl group. Trismethylolaminomethane is a typical hydroxy-substituted primary amine. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(betahydroxypropyl)-N'-beta-aminoethyl)-piperazine, 2-amino-1-butanol, ethanolamine, beta-(beta-hydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxy-propane, N-(beta-hydroxyethoxyethyl)-ethylenediamine, and the like. For further description of the hydroxy-substituted primary amines useful as the N-(hydroxyl-substituted hydrocarbyl) amines in this invention see U.S. Pat. No. 3,576,743 which is expressly incorporated herein by reference for its disclosure of such amines.

Typically, the amine (C)(II) is a primary, secondary or tertiary alkanol amine or mixture thereof. Such amines can be represented, respectively, by the formulae:

$$H_2N-R'-OH, \quad \underset{R}{\overset{H}{\diagdown}}N-R'-OH \text{ and } \underset{R}{\overset{R}{\diagdown}}N-R'-OH$$

wherein each R is independently a hydrocarbyl group of one to about eight carbon atoms or hydroxyl-substituted hydrocarbyl group of two to about eight carbon atoms and R' is a divalent hydrocarbyl group of about two to about eighteen carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to 7 carbon atoms.

The amine (C)((II) can also be an ether N-(hydroxyl-substituted hydrocarbyl)amine. These are hydroxyl-substituted poly(hydrocarbyloxy) analogs of the above-described amines (these analogs also include hydroxyl-substituted oxyalkylene analogs). Such amines can be conveniently prepared by reaction of epoxides with aforedescribed amines and can be represented by the formulae:

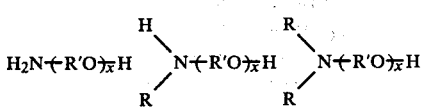

wherein x is a number from 2 to about 15 and R and R' are as described above.

Polyamine analogs of these alkanol amines, particularly alkoxylated alkylene polyamines (e.g., N,N-(diethanol)-ethylene diamine) can also be used to make the solubilizers of this invention. Such polyamines can be made by reacting alkylene amines (e.g., ethylene diamine) with one or more alkylene oxides (e.g., ethylene oxide, octadecene oxide) of two to about twenty carbons. Similar alkylene oxide-alkanol amine reaction products can also be used such as the products made by reacting the aforedescribed primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino radicals or through hydroxy radicals are likewise useful. Condensation through amino radicals results in a higher amine accompanied by removal of ammonia while condensation through the hydroxy radicals results in products containing ether linkages accompanied by removal of water. Mixtures of two or more of any of the aforedescribed mono- or polyamines are also useful.

Particularly useful examples of N-(hydroxyl-substituted hydrocarbyl) amines (C)(II) include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxylethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N'-di(hydroxyl ethyl)piperazine, and the like. Preferred amines are diethyl ethanol amine and ethanol amine and mixtures thereof.

The reaction of component (C)(I) with component (C)(II) to form the nitrogen-containing carboxylic solubilizer (C).

The reaction of the acylating agent (C)(I) with the hydroxyl amine (C)(II) can be carried out at temperatures ranging from about 30° C. to the decomposition temperature of the reaction components and/or products having the lowest such temperature. Generally it is carried out at a temperature in the range of about 50° C. to about 150° C.; but usually at a temperature below about 100° C. Often the reaction is carried out under ester-forming conditions and the product thus formed is, for example, an ester, salt, amide, imide, amic ester or mixture of such products. The salt may be an internal salt, wherein one of the carboxyl groups becomes ionically bound to a nitrogen atom within the same group or it may be an external salt wherein the ionic salt group is formed with a nitrogen atom which is not part of the same group forming the ester group. Mixtures of acylating agents and/or mixtures of hydroxyl amines can be used.

Generally, the ratio of acylating agent (C)(I) to amine (C)(II) is in the range of 0.5 to about 3 moles of amine (C)(II) per equivalent of acylating agent (C)(I). An equivalent of acylating agent (C)(I) can be determined by dividing its molecular weight by the number of carboxyl functions present. These can usually be detrmined from the structural formula of the acylating agent or empirically through well-known titration procedures. For example, a succinic acid anhydride or di(alkyl) ester acylating agent has an equivalent weight of one-half its molecular weight.

In addition to the acylating agent (C)(I) there may also be present in the solubilizer-forming reaction mixture one or more lower molecular weight mono- or polycarboxylic acid acylating agents of one to about less than 18 carbons such as fatty acids having 10 to about 18 carbon atoms or a tetrapropenyl-substituted succinic anhydride. In such cases the moles of lower acylating agent present will be at least less than those of the acylating agent (C)(I) and the total equivalents of lower acylating agent plus acylating agent (C)(I) will still fall within the aforedescribed ratios.

Typical lower (MW) monocarboxylic acylating agents include saturated and unsaturated fatty acids, such as lauric acid, stearic acid, oleic acid, myristic acid, linoleic acid, and the like. Anhydrides, when available, and lower alkyl esters of these acids can also be used. Mixtures of two or more such agents can also be successfully used. An extensive discussion of such acids is found in Kirk-Othmer "Encyclopedia of Claimed Technology" 2nd Edition, 1965, John Wiley & Sons, N.Y., pages 811–856. Acylating agents including acetic acid, propionic acid, butyric acid, acrylic and benzoic acid as well as their anhydrides and lower alkyl esters are also useful.

Among the useful lower Mw polycarboxylic acylating agents are maleic acid, fumaric acid, itaconic acid, mesaconic acid, succinic acid, phthalic acid, alkyl-substituted phthalic acids, isophthalic acid, malonic acid, glutaric acid, adipic acid, citraconic acid, glutaconic acid, chloromaleic acid, atconic acid, scorbic acid, etc. Again anhydrides, when available, and lower alkyl esters and esters of these acids can be used as lower Mw acylating agents.

Certain substituted succinic acid and anhydride lower Mw acylating agents can also be used. A number of these are discussed in the abovecited Kirk-Othmer article at pages 847–849. The typical such acylating agents can be represented by the formula:

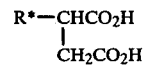

wherein R* is a $C_1$ to about a $C_{10}$ hydrocarbyl group. Preferably, R* is an aliphatic or alicyclic hydrocarbyl group less than 10% of its carbon-to-carbon bonds unsaturated. Examples of such groups are 4-butylcyclohexyl, di(isobutyl), decyl, etc. The production of such substituted succinic acids and their derivatives via alkylation of maleic acid or its derivatives with a halohydrocarbon is well known to those of skill in the art and need not be discussed in detail at this point.

Acid halides of the aforedescribed lower Mw mono- and polycarboxylic acids can be used as lower Mw acylating agents in this invention. These can be prepared by the reaction of such acids or their anhydrides with halogenating agents such as phosphorus tribromide, phosphorus pentachloride, phosphorus oxychloride, or thionyl chloride. Esters of such acids can be prepared simply by the reaction of the acid, acid halide or anhydride with an alcohol or phenolic compound. Particularly useful are the lower alkyl and alkenyl alcohols such as methanol, ethanol, allyl alcohol, propanol, cyclohexanol, etc. Esterification reactions are usually promoted by the use of alkaline catalysts such as sodium hydroxide or alkoxide, or an acidic catalyst such as sulfuric acid or toluene sulfonic acid.

The reaction of acylating agent and hydroxyl amine can be carried out in the presence of a normally liquid, substantially inert, organic solvent/diluent such as benzene, octane, and commercial mixtures such as the various textile spirits and naphthas. Mineral oils in small amounts can also be used. Such solvent/diluents aid in temperature control, viscosity control and the like. Often, however, when the reactants are sufficiently fluid such solvent/diluents are not used and the reaction is carried out in the absence of any materials other than the acylating agent (C)(I) and the hydroxyl amine (C)(II).

The surfactant, (D):

The overbased material (B) is used in combination with either the nitrogen-containing, phosphorus-free carboxylic solubilizers (C) or a surfactant or wetting agent (D), or (E) mixtures of (C) and (D). The surfactant (D) aids in the dispersal of the overbased material (B), solubilizer (C) and functional additive (F), if present, with the aqueous compositions of the invention. Typically, the surfactant (D) is a hydrophilic surfactant and, generally, it has an HLB (hydrophilic-lipophilic balance) in the range of about 10 to about 20.

The surfactant (D) can be of the cationic, anionic, nonionic or amphoteric type. Many such surfactants of each type are known to the art. See, for example, McCutcheon's "Detergents and Emulsifiers", 1978, North American Edition, published by McCutcheon's Division, MC Publishing Corporation, Glen Rock, N.J., U.S.A., particularly pages 17–33 which are hereby incorporated by reference for their disclosures in this regard.

Of these surfactants (D), nonionic surfactants are generally used. A number of nonionic surfactant types are known. Among these are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the derivatives of the present invention are the alkylene oxide-treated alkyl phenols such as the ethylene oxide alkyl phenol condensates sold by the Rohm & Haas Company. A specific example of these is Triton X-100 which contains an average of 9–10 ethylene oxide units per molecule, has an HLB value of about 13.5 and a molecular weight of about 628. Many other suitable nonionic surfactants are known; see, for example, the aforementioned McCutcheon's as well as the treatise "Nonionic Surfactants" edited by Martin J. Schick, M. Drekker Co., New York, 1967, which is hereby incorporated by reference for its disclosures in this regard.

As noted above, cationic, anionic and amphoteric surfactants can also be used in combination with the overbased materials (B) and optionally the solubilizers (C) in this invention. Generally, these are all hydrophilic surfactants. Anionic surfactants contain negatively charged polar groups while cationic surfactants contain positively charged polar groups. Amphoteric dispersants contain both types of polar groups in the same molecule. A general survey of useful surfactants is found in Kirk-Othmer Encyclopedia of Chemical Technology, Second Edition, Volume 19, page 507 and following (1969, John Wiley and Son, New York) and the aforementioned compilation published under the name of McCutcheon's. These references are both hereby incorporated by reference for their disclosures relating to cationic, amphoteric and anionic surfactants.

Among the useful anionic surfactant types are the widely known metal carboxylate soaps, organo sulfates, sulfonates, sulfocarboxylic acids and their salts, and phosphates. Useful cationic surfactants include nitrogen compounds such as amine oxides and the well known quaternary ammonium salts. Amphoteric surfactants include amino acid type materials and similar types. Various cationic, anionic and amphoteric dispersants are available from the industry, particularly from such companies as Rohm and Haas and Union Carbide Corporation, both of America. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

The Functional Additive (F):

The functional additives (F) that can be dispersed with the compositions of this invention are generally well known to those of skill in the art as mineral oil and fuel additives. They generally are not soluble in water beyond the level of one gram per 100 milliliters at 25°, and often are less soluble than that. Their mineral oil solubility is generally about at least one gram per liter at 25°.

Among the functional additives (F) are extreme pressure agents, corrosion and oxidation inhibiting agents, such as chlorinated aliphatic hydrocarbons (e.g., chlorinated waxes), and organic sulfides and polysulfides (e.g., benzyl disulfide, bis(chlorobenzyl)disulfide, dibutyltetrasulfide, sulfurized methyl esters of fatty acid, sulfurized alkyl phenols, sulfurized dipentenes and sulfurized terpenes).

The functional additive (F) can also be chosen from phosphorus-containing materials and include phosphosulfurized hydrocarbons such as the reaction product of a phosphorus sulfide with terpenes or methyl fatty esters, phosphorus esters such as the acid dihydrocarbyl and trihydrocarbyl phosphites such as dibutyl phosphites, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal salts of acid phosphate and thiophosphate hydrocarbyl ester such as zinc dicyclohexyl phosphorodithioate, zinc dioctylphosphorodithioate, barium di(heptylphenol)-phosphorodithioate, cadmium dinonylphosphorodithioate, and the zinc salt of a phosphorodithioic acid products by the reaction of phosphorus pentasulfide with an equimolar mixture of isopropyl alcohol and n-hexyl alcohol.

Other types of suitable functional additives (F) include carbamates and their thioanalogs, overbased and gelled overbased carboxylic, sulfonic and phosphorus acid salts, high molecular weight carboxylate esters, and nitrogen-containing modifications thereof, high molecular weight phenols, condensates thereof; high molecular weight amines and polyamines; high molecular weight carboxylic acid/amino compound products, etc. Typically, these functional additives are anti-wear, extreme pressure, and/or load-carrying agents, such as the well known metal salts of acid phosphates and acid thiophosphate hydrocarbyl esters. An example of the latter are the well known zinc di(alkyl) or di(aryl) dithiophosphates. Further descriptions of these and other suitable functional additives (F) can be found in the aforementioned treatises "Lubricant Additives" which are hereby incorporated by reference for their disclosures in this regard.

Examples 85-92 illustrate preparation of solubilizers (C), combinations of solubilizers (C) with surfactants (D) and aqueous compositions that in some instances include a functional additive (F) and which can be used in the preparation of the compositions of the invention.

EXAMPLE 85

To 6720 parts of poly(isobutene)-substituted succinic anhydride (having a molecular weight of about 1120), heated to 90° C. with stirring, is slowly added over 1.5 hours 702 parts of N,N-diethylethanol amine. The mixture is held at 90° C. for 0.5 hour and cooled to provide the desired product.

EXAMPLE 86(A)

To 6720 parts of a poly(isobutene)-substituted succinic anhydride (having a molecular weight of 1120), heated to 90° C. with stirring, is slowly added over 1.5 hours 702 parts of diethyl ethanol amine. This intermediate mixture is heated for an additional 0.5 hour at 90° C. and then 366 parts of monoethanol amine is added. The mixture is held at 90° C. for a final 0.5 hour and cooled to provide the desired product.

EXAMPLE 86(B)

A mixture is prepared containing 3600 parts of the product described in Example 86(A), 2160 parts of a naphthenic neutral hydrocarbyl oil having a viscosity of 100 SSU at 100° F., 1440 parts of Triton X-100 and 1800 parts of a commercially available load-carrying additive which is the zinc salt of an acid O,O'-di(alkyl-substituted phenyl) dithiophosphate. This mixture is heated to 90° and stirred for 0.5 hour. This concentrate can be diluted with water in the ratio of 80 parts water to 20 parts concentrate.

EXAMPLE 87(A)

To a charge of 224 parts of the succinic anhydride described in Example 86(A), heated in a resin kettle with stirring at about 90°, is slowly added over a two-hour period 468 parts of diethyl ethanol amine. Heating is continued for an additional hour at 90° C. The desired solubilizer is a viscous, brownish liquid at room temperature.

EXAMPLE 87(B)

A charge of 4000 parts of the solubilizer, 1000 parts of Triton X-100 and 1667 parts of the commercial anti-wear, load-carrying agent described in Example 86(B) is mixed well at 60° C. to provide a concentrate useful in formulating water-based hydraulic fluids.

EXAMPLE 88(A)

A mixture is formed by coupling 30 parts of the oil of Example 87(B), 40 parts of the product of Example 86(A) and 30 parts of a commercial surfactant sold under the name Minfoam 2X by the Union Carbide Corporation and identified as a modified linear alcohol ethoxylate is combined to form a mixture.

When 3 parts of this mixture is combined with 7 parts of water and agitated, an aqueous system is formed which shows none of the characteristics of an emulsion. The system is not opaque and there is no obvious phase separation.

EXAMPLE 88(B)

Nine parts of the mixture of Example 88(A) is combined with 1 part of a commercial high molecular weight, oil-soluble poly(isobutene)-substituted succinic acid/polyol ester dispersant, a well-known functional additive. This combination is then combined with water in the ratio of 3 parts combination to 7 parts water. After agitation the system thus formed, again, does not appear to be an emulsion and is not opaque nor does it show signs of phase separation.

EXAMPLE 89(A)

A mixture of 4200 parts of the solubilizer described in Example 87(A), 1680 parts of the surfactant described in Example 86(B) and 2520 parts of a zinc di(isooctyl) dithiophosphate is stirred for one hour at 60° C. and then stored for an additional hour to form a combination.

EXAMPLE 89(B)

Eight thousand parts of the combination of Example 89(A) is mixed for two hours with 12,000 parts water at a temperature of about 38° C. to form an aqueous system. This system is then poured through a 30 mesh screen to give an aqueous concentrate having a density of 8.39 pounds per gallon.

EXAMPLE 90

A combination is prepared in essentially the same fashion as described in Example 89(A) and (B) from 20 parts of the solubilizer described in Example 86(A), 8 parts of the surfactant described in Example 86(B), 8 parts of a commercial anti-wear and load-carrying agent, which is a zinc salt of O,O'-di(isooctyl)dithiophosphoric acid, and 4 parts of a commercial anti-wear agent which is an isobutene-derived polysulfide. This is combined with 60 parts of water to form an aqueous system which is an aqueous concentrate. This system can be diluted in the ratio of 5 parts per weight system to 95 parts by weight water.

EXAMPLE 91

A mixture of 220 parts of the product of Example 86(A), 120 parts of the zinc dithiophosphate of Example 89(A) and 80 parts of sodium lauryl ether sulfate (sold by Alcolac, Inc., under the trade name Sipon ESY) is prepared. To this stirred mixture at 40°–50° C. is slowly added 565 parts water and then 15 parts aminopropyl morpholine. The mixture is stirred well to provide the desired concentrate.

EXAMPLE 92

A mixture is prepared of 220 parts of the product of Example 86(A), 120 parts of the zinc dithiophosphate of Example 89(A) and 80 parts of an ethoxylated oleyl amine (sold under the trade name "Ethomeen O/15" by The Armour Corporation). The mixture is heated to 40°–50° and 20 parts by weight aminopropyl morpholine is slowly added; then 560 parts water is added and the mixture stirred for approximately 0.75 hours to yield a well-mixed concentrate.

Component (G):

Component (G) is a polyhydroxy compound or the partial ether of a polyhydroxy compound which is useful in enhancing the stabilization of the dispersions and slurries formed in accordance with the present invention, particularly when such dispersions or slurries are formed with component (B)(II) said non-Newtonian colloidal disperse systems. Component (G) is preferably soluble in water and the organic liquids provided in the compositions of the invention, and is selected from the polyhydroxy compounds and partial ethers that have a sufficiently high boiling point so as to not evaporate from the aqueous systems in which they are employed. While not wishing to be bound by theory, it is believed that component (G) enhances the useful life of the dispersions and slurries of the invention by functioning as a coupling agent so as to prohibit or retard breakdown of the multiple phase composition of these systems. Component (G) can be selected from a wide variety of organic polyhydroxy compounds which includes aliphatic, cycloaliphatic and aromatic polyhydroxy compounds, and a wide variety of partial ethers of polyhydroxy compounds. These compounds may contain other functionality including ester groups, etc.

Representative examples of the polyhydroxy compounds include: ethylene glycol, propylene glycol, trimethylene glycol, 1,2-butylene glycol, 1,3-butane diol, 1,4-butane diol, 1,5-pentane diol, 1,2-hexylene glycol, 1,10-decane diol, 1,2-cyclohexane diol, 2-butene-1,4-diol, 3-cyclohexene-1,1-dimethanol, 4-methyl-3-cyclohexene-1,1-dimethanol, 3-methylene-1,5-pentanediol, 3,2-hydroxyethyl cyclohexanol, 2,2,4-trimethyl-1,3-pentanediol, 2,5-dimethyl-2,5-hexane diol, and the like; alkylene oxide modified diols such as diethylene glycol, (2-hydroxyethoxy)-1-propanol, 4-(2-hydroxyethoxy)-1-butanol, 5-(2-hydroxyethoxy)-1-pentanol, 3-(2-hydroxypropoxy)-1-propanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, 1-(2-hydroxymethoxy)-2-hexanol, 1-(2-hydroxyethoxy)-2-octanol, and the like. Representative examples of ethylenically unsaturated low molecular weight polyols include 3-allyloxy-1,5-pentanediol, 3-allyloxy-1,2-propanediol, 2-allyloxymethyl-2-methyl-1,3-propanediol, 2-methyl-2-[(4-pentenyloxy)methyl]-1,3-propanediol, and 3-(o-propenylphenoxy)-1,2-propanediol. Representative examples of low molecular weight polyols having at least 3 hydroxyl groups include glycerol, 1,2,6-hexanetriol, 1,1,1-trimethylolpropane, 1,1,1-trimethylolethane, pentaerythritol, 3-(2-hydroxyethoxy)-1,2-propanediol, 3-(2-hydroxypropoxy)-1,2-propanediol, 6-(2-hydroxypropoxy)-1,2-hexanediol, 2,(2-hydroxyethoxy)-1,2-hexanediol, 2,4-dimethyl-2-(2-hydroxymethoxy)methylpentanediol-1,5:mannitol, glactitol, talitol, iditol, allitol, altritol, guilitol, arabitol, ribitol, xylitol, erythritol, threitol, 1,2,5,6-tetrahydroxyhexane, meso-inisitol, sucrose, glucose, galactose, mannos, fructose, xylose, arabinose, dihydroxyacetone, glucose-alpha-methylglucoside, 1,1,1-tris[(2-hydroxyethoxy)methyl]ethane, and 1,1,1-tris[(2-hydroxypropoxy)methyl]propane. Exemplary diphenylol compounds include 2,2-bis(p-hydroxyphenyl) propane, bis(p-hydroxyphenyl) methane and the various diphenols and diphenylol methanes disclosed in U.S. Pat. Nos. 2,506,486 and 2,744,882, respectively. Each of these patents is incorporated herein by reference. Examplary triphenylol compounds which can be employed include the alpha, alpha, omega, tris(hydroxyphenyl)alkanes such as 1,1,3-tris(hydroxyphenyl)ethane, 1,1,3-tris(hydroxyphenyl)propane, 1,1,3-tris(hydroxy-3-methylphenyl)propane, 1,1,3-tris(dihydroxy-3-methylphenyl)propane, 1,1,3-tris(hydroxy-2,4-dimethylphenyl)propane, 1,1,3-tris(hydroxy-2,5-dimethylphenyl)propane, 1,1,3-tris(hydroxy-2,6-dimethylphenyl)propane, 1,1,4-tris(hydroxyphenyl)butane, 1,1,4-tris(hydroxyphenyl)-2-ethylbutane, 1,1,4-tris(-dihydroxyphenyl)butane, 1,1,5-tris(hydroxyphenyl)-3-methylpentane, 1,1,8-tris(hydroxyphenyl)octane, and 1,1,10-tris(hydroxyphenyl)decane. Tetraphenylol compounds which can be used in this invention include the alpha, alpha, omega, omega, tetrakis(hydroxyphenyl)alanes such as 1,1,2,2,-tetrakis(hydroxyphenyl)ethane, 1,1,3,3,-tetrakis(hydroxy-3-methylphenyl)propane, 1,1,3,3-tetrakis(dihydroxy-3-methylphenyl)propane, 1,1,4,4-tetrakis(hydroxyphenyl)butane, 1,1,4,4-tetrakis(-hydroxyphenyl)-2-ethylbutane, 1,1,5,5-tetrakis(hydroxyphenyl)pentane, 1,1,5,5-tetrakis(hydroxyphenyl)-3-methylpentane, 1,1,5,5-tetrakis(dihydroxyphenyl)pentane, 1,1,8,8-tetrakis(hydroxy-3-butylphenyl)octane, 1,1,8,8-tetrakis(dihydroxy-3-butylphenyl)octane, 1,1,8,8-tetrakis(hydroxy-2,5-dimethylphenyl)octane, 1,1,10,10-tetrakis(hydroxyphenyl)decane, and the corresponding compounds which contain substituent groups in the hydrocarbon chain such as 1,1,6,6-tetrakis(hydroxyphenyl)-2-hydroxyhexane, 1,1,6,6-tetrakis(hydroxyphenyl)-2-hydroxy-5-methylhexane, and 1,1,7,7-tetrakis(hydroxyphenyl)-3-hydroxyheptane.

The partial ethers of polyhydroxy compounds that are useful with the present invention can be represented by the formula

wherein y is an integer of from about 1 to about 15, preferably about 1 to about 5, and advantageously about 1 or 2; $R^1$ is an alkyl or alkenyl group of about 2 to 6, preferably about 2 or 3, carbon atoms; and $R^2$ is an aliphatic or an aromatic group of about 1 to about 30 carbon atoms, preferably about 1 to about 15 carbon atoms, advantageously about 1 to about 10 carbon atoms, and in a particularly advantageous embodiment from about 1 to about 6 carbon atoms. The aromatic group can be unsubstituted, or substituted with one or more up to the number of unsatisfied valences on aromatic nucleus with an alkyl or alkoxy group of up to about 7 carbon atoms or a nitro group or a halogen atom. Representative examples of these partial ethers include: the alkoxy alkanols; alkoxypoly (alkyleneoxy) alkanols; alkyl- and dialkyl phenoxypoly (alkyleneoxy) alkanols; and mixtures thereof, defined by the above formula. Examples of the partial ethers that are useful with the composition of the present invention include 2-methoxy ethanol; 2-ethoxy ethanol; 2-propoxy ethanol; 2-butoxy ethanol; 2-pentoxy ethanol; 2-hexyloxy ethanol; 2-heptyloxy ethanol; 2-octyloxy ethanol; 2-nonyloxy ethanol; 2-eicosyloxy ethanol; 2-triacontyloxy ethanol; 2- or 3-methoxy propanol; 2- or 3-ethoxy propanol; 2- or 3-propoxy propanol; 2- or 3-butoxy propanol; 2- or 3-pentoxy propanol; 2- or 3-hexyloxy propanol; 2-(2-methoxyethoxy) ethanol; 2- or 3-(2-methoxyethoxy) propanol; 2-(2-methoxypropoxy) ethanol; 2-(2-butoxyethoxy) ethanol; 2-(2-ethoxyethoxy) ethanol; 2- or 3-(2-methoxypropoxy) propanol; 2- or 3-(2-ethoxyethoxy) propanol; 2-(2-ethoxypropoxy) ethanol; 2- or 3-(2-ethoxypropoxy) propanol; 2-(2-propoxyethoxy) ethanol; 2- or 3-(2-propoxyethoxy) propanol; 2-(2-propoxypropoxy) ethanol; 2- or 3-(2-propoxypropoxy) propanol; 2- or 3-(2-butoxyethoxy) propanol; 2-(2-butoxypropoxy) ethanol; 2- or 3-(2-butoxypropoxy) propanol; 2-(2-pentoxyethoxy) ethanol; 2-(2-hexyloxyethoxy) ethanol; etc. Mixtures of two or more of the above partial ethers can be used. Preferred partial ethers are 2-butoxy ethanol and 2-(2-butoxyethoxy)ethanol. Examples of commercially available partial ethers that are suitable for use with the compositions of the present invention include: methyl, butyl, n-hexyl and phenyl Cellosolve, products of Union Carbide Corporation identified as ethers of ethylene glycol; methyl, butyl and n-hexyl Carbitol, products of Union Carbide Corporation identified as ethers of diethylene glycol.

Generally, the compositions of the invention comprise an effective amount of water to provide a dispersion of component (B) with water. Component (C), if present, is provided at a weight ratio relative to component (B) in the range of about 1:10 (i.e., 1 part component (C) for every 10 parts component (B)) to about 2:1, preferably about 1:5 to about 1:1, and advantageously about 2 to about 3 parts of component (B) for every part of component (C). Component (D), if present, is provided at a weight ratio relative to component (B) in the range of about 1:10 to about 2:1, preferably about 1:5 to about 1:1, and advantageously about 2 to about 3 parts component (B) for every part of component (D). Component (E), if present, is provided at a weight ratio relative to component (B) in the range of about 1:10 to about 1:2, preferably about 1:5 to about 1:1, and advantageously about 2 or 3 parts component (B) for every part of component (E). Component (E) preferably comprises from about 25 to about 75 weight percent of component (C) and from about 75 to about 25 weight percent of component (D), preferably from about 40 to about 60 weight percent component (C) and from about 60 to about 40 weight percent component (D). Component (F), if present, is provided at a weight ratio relative to component (B) in the range of about 1:10 to about 1:1, preferably about 1:5 to about 1:1, and advantageously about 2 to about 3 parts component (B) for every part of component (F). Component (G), if present, is provided at a weight ratio relative to component (B) in the range of about 1:20 to about 1:2, preferably about 1:7.5.

The aqueous compositions of the present invention preferably contain at least about 25% water and less than about 50% hydrocarbyl oil. The relative amounts of components (B), (C), (D), (E), (F) and (G), when present, are within the ratios stated above so that if the water is withdrawn from the system these amounts will be within these ratios. These aqueous compositions may contain less than about 15% or 5% hydrocarbyl oil and may be substantially oil-free (i.e., less than 2% oil).

Additive concentrates containing water and component (B) along with components (C), (D) or (E) and optionally components (F) and/or (G) can contain more or less than 25% (by weight) water. Aqueous concentrates preferably contain about 25% to about 70% water; generally about 40% to about 65% water. However, substantially non-aqueous concentrates, which are analogous to the aforedescribed aqueous concentrates except they contain less water (i.e., less than 25%) contain a sufficient quantity of water to provide a dispersion of component (B) with water.

The substantially non-aqueous and aqueous concentrates of this invention can both be converted to water-based (i.e., aqueous) functional fluids by dilution with water. This dilution is usually done by standard mixing techniques. This is often a convenient procedure since the concentrate can be shipped to the point of use before the additional water is added. Thus, the cost of shipping a substantial amount of the water in the final water-based functional fluid is saved. Only the water necessary to formulate the concentrate (which is determined primarily by ease of handling and convenience factors), need be shipped.

Generally these water-based fluids are made by diluting the aforedescribed substantially non-aqueous and aqueous concentrates with water, wherein the ratio of water to concentrate is in the range of about 80:20 to about 99:1 by weight. As can be seen when dilution is carried out within these ranges, the final water-based functional fluid contains a relatively small amount and in some instances a very insignificant amount of hydrocarbyl oil. This clearly distinguishes them from soluble oils.

Also included within the invention are methods for preparing aqueous systems, including both aqueous concentrates and water-based functional fluids, containing components (A) and (B), along with components (C), (D) or (E) and optionally component (F) and/or (G). These methods comprise the steps of:

(1) mixing the combination of components (A) and (B) with component (C), (D) or (E) and optionally component (F) and/or (G) to form a dispersion/solution, the water content of said dispersion/solution preferably being less than about 25% by weight; optionally (2) combining said dispersion/solution with water to form said aqueous concentrates, either simultaneously or sequentially, if desired; and/or (3) diluting said dispersion/solution or concentrate with water wherein the total amount of water used is in the amount required to provide the desired concentration of component (B) in said concentrate or said water-based functional fluids.

These mixing steps are carried out using conventional equipment and generally at room or slightly elevated temperatures, usually below 100° C. and often below 50° C. The total amounts components (A), (B), (C), (D), (E), (F) and (G) are within the ratios set forth above. As noted above, the non-aqueous or aqueous concentrate can be formed and then shipped to the point of use where it is diluted with water to form the desired water-based functional fluid. In other instances the finished water-based functional fluid can be formed directly in the same equipment used to form the concentrate or dispersion/solution.

Examples 93-97 are directed to the preparation of aqueous compositions containing overbased materials suitable for use in accordance with the invention.

EXAMPLE 93

A mixture of 2668.5 parts of the overbased material of Example 84 and 1476 parts of a 60% mineral oil solution of sodium petroleum sulfonate (having a sulfated ash content of about 8.5%) are heated at 50°-60° C. for 0.5 hour. The resulting mixture is cooled to room temperature and mixed for 0.5 hour with 355.5 parts of butyl Carbitol, a product of Union Carbide Corporation identified as 2-(2-butoxyethoxy) ethanol. The resulting product is admixed with water to a desired level to provide an aqueous concentrate or system in accordance with the invention.

EXAMPLE 94

A mixture of 1800 parts of the overbased material of Example 84, 540 parts of the carboxylic solubilizer of Example 85, 360 parts of the sodium petroleum sulfonate identified in Example 93 and 45 parts of diethylethanol amine is prepared, heated to 50°-60° C. and then mixed with 1800 parts of water over a period of one hour at room temperature. 45 parts of diethylethanol amine are then added to the mixture to yield the desired product.

EXAMPLE 95

A mixture of 1850 parts of the product of Example 94 and 1850 parts of water is prepared. The resulting dispersion exhibits the following Timken values: in one test run a Timken OK load of 85 pounds, a unit load of 21,575 psi; and in a second run a Timken OK load of 90 pounds, a unit load of 22,275 psi.

EXAMPLE 96

A mixture of 1536 parts of the product of Example 94 and 2164 parts of water is prepared. The resulting dispersion exhibits the following Timken values: in one test run a Timken OK load of 95 pounds, a unit load of 24,725 psi; and in a second test run a Timken OK load of 100 pounds, a unit load of 25,375 psi.

EXAMPLE 97

A mixture of 42.5 parts of the product of Example 84, 23.5 parts of the sodium petroleum sulfonate identified in Example 93 and 34 parts of water are mixed thoroughly to provide a desired dispersion.

In a particularly advantageous embodiment of the invention, a method is provided for cutting or wafering a workpiece of a hard material such as quartz, silicon, germanium, gem stones, glass and the like comprising the steps of: providing a slurry saw comprising at least one cutting band, a frame for carrying said cutting band, means for moving said frame while maintaining said band in contact with said workpiece, and means for applying a slurry to the point of contact of said band and said workpiece; providing a slurry of a suitable abrasive or grit material and an aqueous composition in accordance with the present invention; moving said frame while maintaining said band in contact with said workpiece and simultaneously applying said slurry to the point of contact of sand band and said workpiece until the desired cut in said workpiece is made. This method is particularly applicable for use with multiple-blade slurry saws in the cutting or wafering of workpieces of silicon, germanium, crystalline or fused quartz, glass including crown and flint glasses, ferrite, tantalates, niobates, carbides, ferrous and non-ferrous alloys, ceramics, piezoelectric quartz crystal and various crystalline and amorphous specialty materials used in optical and electro-optical applications.

Multiple blade slurry saws are well known to those skilled in the art, an example of which is described in U.S. Pat. No. 3,079,908, the disclosure of this patent being incorporated herein by reference. In general, these saws have the following basic components: blade frame, drive system, travel guide, feed, feed guide, and abrasive system. The blade frame carries at least one but preferably a plurality of steel blades and maintains the blades in proper spacing such that the slices or wafers produced are of uniform thickness. The drive system is the motive power in the saw and includes a prime mover, speed reduction, and conversion from rotary to reciprocating motion. The travel guide establishes the travel line for the blade frame to move which must be a straight line in relation to the blades. The feed applies and maintains the contacting relationship between the blades and the workpiece. The feed guide raises the workpiece or lowers the blade frame as the cut progresses such that the cut remains in the plane of the blades. The abrasive system mixes, transports and gathers the abrasive slurry for reuse and protects the working parts of the saw from the abrasive to prevent high or abnormal wear. Since the design and construction of these saws are well known to those skilled in the art, further description of these saws need not be provided herein.

The abrasive or grit material used in accordance with the foregoing method can be any abrasive commonly used in slurry saw processes. Examples of such abrasives include silicon carbide, aluminum oxide, tungsten carbide, iron carbide, diamond dust, silica and talc. Silicon carbide is preferred. These abrasives generally have an average particle size of about 2 to about 120 microns, preferably about 20 to about 40 microns. The slurries provided in accordance with the method generally comprise up to about 8 pounds, preferably about 4 to about 5 pounds, of abrasive per gallon of the aqueous composition provided in accordance with this invention.

In another aspect of the invention the aqueous compositions provided herein can be slurried with a suitable abrasive, such as aluminum oxide, silicon carbide, tungsten carbide, iron carbide, diamond dust, silica, talc, etc. and used in conventional lapping operations, such as crystal lapping, and in conventional metal working and polishing operations. The abrasives used in accordance with such processes generally have an average particle size of up to about 40 microns, preferably about 3 to about 12 microns. The slurries provided herein generally comprise up to about 8 pounds, preferably about 4 to about 5 pounds, per gallon of the aqueous compositions provided in accordance with the invention.

A particular feature of the above-described slurries is that component (G) a polyhydroxy compound or the partial ether of a polyhydroxy compound tends to enhance the useful life of the abrasive slurries provided in accordance with this invention. Although abrasive slurries prepared in accordance with the present invention that do not include component (G) are suitable abrasive slurries, the incorporation of component (G) into these slurries tends to extend the useful life of such slurries.

EXAMPLE 98

An aqueous composition consisting of 46.5 percent by weight of the product of Example 97 and 53.5 percent by weight of water is prepared and then mixed with 600 mesh silicon carbide abrasive at a level of 4–5 pounds of abrasive per gallon of said aqueous composition to provide an abrasive slurry suitable for use with a multiple blade slurry saw.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:
1. An aqueous composition comprising:
 (A) water;
 (B) an overbased material dispersed with component (A), said overbased material being selected from the group consisting of (B)(I) a Newtonian overbased material or (B)(II) a non-Newtonian colloidal disperse system comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions; and
 an effective amount of at least one additional component to disperse component (B) with component (A), said additional component being selected from the group consisting of
 (C) at least one nitrogen-containing, phosphorus-free carboxylic solubilizer made by the reaction of (C)(I) at least one carboxylic acid acylating agent having at least one hydrocarbon-based substituent of about 12 to about 500 carbon atoms with (C)(II) at least one (a) N-(hydroxyl-substituted hydrocarbyl)amine, (b) hydroxyl-substituted poly(hydrocarbyloxy) analog of said amine or (c) mixture of (a) and (b),
 (D) at least one surfactant, or
 (E) mixture of (C) and (D).

2. The composition of claim 1 wherein said additional component is component (C), the weight ratio of component (C) to component (B) being in the range of about 1:10 to about 2:1.

3. The composition of claim 2 wherein the ratio of component (C) to component (B) is in the range of about 1:5 to about 1:1.

4. The composition of claim 3 wherein the ratio of component (B) to component (C) is about 2 to about 3 parts component (B) for every part component (C).

5. The composition of claim 1 wherein said additional component is component (D), the weight ratio of component (D) to component (B) being in the range of about 1:10 to about 2:1.

6. The composition of claim 5 wherein the ratio of component (D) to component (B) is in the range of about 1:5 to about 1:1.

7. The composition of claim 6 wherein the ratio of component (B) to component (D) is in the range of about 2 to about 3 parts component (B) for every part component (D).

8. The composition of claim 1 wherein said additional component is component (E), the weight ratio component (E) to component (B) being in the range of about 1:10 to about 2:1.

9. The composition of claim 8 wherein the ratio of component (E) to component (B) is in the range of about 1:5 to about 1:1.

10. The composition of claim 9 wherein the ratio of component (B) to component (E) is in the range of about 2 to about 3 parts component (B) for every part component (E).

11. The composition of claim 1 wherein component (B) is (B)(II) said non-Newtonian colloidal disperse system, the solid metal-containing colloidal particles of said system being characterized by an average unit particle size of at least 20 A. and up to about 5,000 A., said particles having formed in situ in said disperse system from metal-containing materials homogeneously dispersed in a single phase Newtonian overbased material characterized by a metal ratio of at least 1.1.

12. The composition of claim 1 wherein component (B) is (B)(I) said Newtonian overbased material, the metal ratio of said Newtonian overbased material being at least about 3.5.

13. The composition of claim 11 wherein the solid metal-containing colloidal particles are further characterized by having a unit particle size of from about 20 A. to about 1000 A.

14. The composition of claim 1 wherein component (B) is (B)(II) said non-Newtonian colloidal disperse system, said disperse medium being a combination of mineral oil and at least one other organic liquid miscible with the mineral oil.

15. The composition of claim 1 wherein component (B) is (B)(II) said non-Newtonian colloidal disperse system, the solid-metal containing particles being selected from the class consisting of alkali and alkaline earth metal salts.

16. The composition of claim 15 wherein said third component comprises at least one member selected from the class consisting of alkali and alkaline earth metal salts of oil-soluble organic acids.

17. The composition of claim 15 wherein said third component consists essentially of at least one member selected from the class consisting of alkali and alkaline earth metal salts of oil-soluble sulfonic acids and carboxylic acids.

18. The composition of claim 17 wherein the salts of the oil-soluble sulfonic acids and carboxylic acids are alkaline earth metal salts.

19. The composition of claim 18 wherein the solid metal-containing colloidal particles are alkaline earth metal salts of inorganic acid materials.

20. The composition of claim 18 wherein the solid metal-containing colloidal particles are selected from the group consisting of alkaline earth metal acetates, formates, carbonates, hydrogen carbonates, hydrogen sulfides, sulfites, hydrogen sulfites, and chlorides.

21. The composition of claim 20 wherein said solid metal-containing colloidal particles are selected from the class consisting of calcium and barium carbonates and acetates.

22. The composition of claim 19 comprising (1) solid metal-containing colloidal particles consisting essentially of alkaline earth metal salts, these salts being characterized by an average unit particle size in the range of about 30 A. to about 400 A. and having been formed in situ, (2) said particles being predispersed in a dispersing medium comprising a solution of at least one non-mineral oil inert hydrocarbon liquid miscible with mineral oil and a mineral oil, and (3) as an essential third component, at least one organic compound which is soluble in the disperse medium and which is selected from the class consisting of alkaline earth metal salts of oil-soluble petrosulfonic acids, mono-, di-, and trialiphatic hydrocarbon substituted aryl sulfonic acids, and oil-soluble carboxylic acids, wherein said solid, metal-containing colloidal particles of (1) are selected from the class consisting of alkaline earth metal carbonates and hydrogen carbonates or mixtures thereof and these particles are present in an amount such that there is at least about 3.5 equivalents to about 19 equivalents of alkaline earth metal in the colloidal particles per equivalent of organic acid present in (3).

23. The composition of claim 1 wherein component (B) is (B)(II) said non-Newtonian colloidal disperse system, said third component being at least one organic compound which is soluble in said disperse medium, the molecules of said organic compound being characterized by a hydrophobic portion and at least one polar substituent excluding alkali and alkaline earth metal carboxylate and sulfonate groups.

24. The composition of claim 23 wherein said solid, metal-containing colloidal particles are selected from the group consisting of alkaline earth metal acetates, formates, carbonates, hydrogen carbonates, hydrogen sulfides, sulfites, hydrogen sulfites, and chlorides.

25. The composition of claim 16 wherein said solid, metal-containing colloidal particles of (1) are present in an amount such that there is at least about 3.5 equivalents of alkaline earth metal in the colloidal particles per equivalent of the oil-soluble organic acids of (3).

26. The composition of claim 25 wherein the metal-containing colloidal particles of (1) are selected from the group consisting of metal acetates, formates, carbonates, hydrogen carbonates, hydrogen sulfides, sulfites, hydrogen sulfites, and chlorides.

27. The composition of claim 1 wherein the acylating agent (C)(I) is a polycarboxylic acid acylating agent and the hydrocarbon-based substituent has an average of about 12 to about 500 carbon atoms and is purely hydrocarbyl.

28. The composition of claim 1 wherein said acylating agent (C)(I) is represented by the formula:

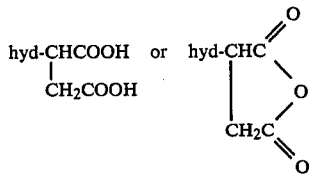

wherein hyd is a hydrocarbon-based alkyl or alkenyl group having an average of about 12 to about 500 carbon atoms.

29. The composition of claim 1 wherein component (D) is a non-ionic, cationic, or anionic hydrophilic surfactant.

30. The composition of claim 1 wherein (C)(II) is a N-(hydroxyl-substituted hydrocarbyl)amine.

31. The composition of claim 1 wherein the component (D) is a non-ionic hydrophilic surfactant having an HLB value of about 10 to about 20.

32. The composition of claim 1 wherein component (C)(II) is a primary, secondary or tertiary alkanol amine of two to about 40 carbon atoms or mixtures of two or more thereof.

33. The composition of claim 1 wherein the hydrocarbon-based substituent of component (C)(I) is poly(isobutene).

34. The composition of claim 1 wherein the hydrocarbon-based substituent of component (C)(I) has from 20 to about 500 carbon atoms.

35. The composition of claim 1 wherein the hydrocarbon-based substituent of component (C)(I) has from about 30 to about 500 carbon atoms.

36. The composition of claim 1 wherein the hydrocarbon-based substituent of component (C)(I) has from about 50 to about 500 carbon atoms.

37. The composition of claim 28 wherein hyd is poly(isobutene).

38. The composition of claim 28 wherein hyd has from about 20 to about 500 carbon atoms.

39. The composition of claim 28 wherein hyd has from about 30 to about 500 carbon atoms.

40. The composition of claim 28 wherein hyd has from about 50 to about 500 carbon atoms.

41. The composition of claim 1 wherein component (C) is made by reaction of (C)(I) at least one carboxylic acid acylating agent represented by the formulae:

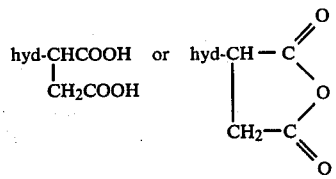

wherein hyd is a hydrocarbon-based alkyl or alkenyl group having an average of about 12 to about 500 carbon atoms with (C)(II) an amine selected from the group consisting of (a') primary, secondary and tertiary alkanol amines which can be presented correspondingly by the formulae:

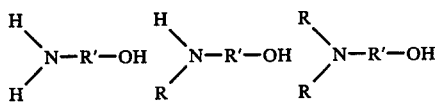

(b') hydroxyl-substituted oxyalkylene analogs of said alkanol amines represented correspondingly by the formulae:

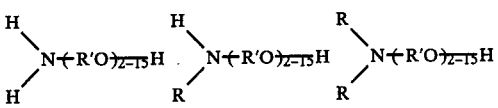

wherein each R is independently a hydrocarbyl group of one to about eight carbon atoms or hydroxyl-substituted hydrocarbyl group of two to about eight carbon atoms and R' is a divalent hydrocarbyl group of two to about eighteen carbon atoms, and (c') mixtures of two or more thereof.

42. The composition of claim 41 wherein the amine (C)(II) is a mixture of diethyl ethanol amine and ethanol amine.

43. The composition of claim 41 wherein the hyd group is a poly(isobutene).

44. The composition of claim 41 wherein hyd has from about 20 to about 500 carbon atoms.

45. The composition of claim 41 wherein hyd has from about 30 to about 500 carbon atoms.

46. The composition of claim 41 wherein hyd has from about 50 to about 500 carbon atoms.

47. The composition of claim 1 which also comprises (F) at least one functional additive.

48. The composition of claim 47 wherein the functional additive (F) is at least one oil-soluble, water-insoluble phosphorous- and/or sulfur-containing functional additive.

49. The composition of claim 47 wherein the functional additive (F) is a metal salt of a phosphate or thiophosphate hydrocarbyl ester.

50. The composition of claim 1 which also comprises (G) a dispersion enhancer selected from the group consisting of polyhydroxy compounds and partial ethers of polyhydroxy compounds.

51. The composition of claim 50 wherein component (G) is 2-butoxy ethanol or 2-(2-butoxy ethoxy) ethanol.

52. The composition of claim 1 with at least about 25% by weight water, and less than about 50% hydrocarbyl oil.

53. The composition of claim 52 with at least about 70% by weight water.

54. The composition of claim 52 with (G) a dispersion enhancer selected from the group consisting of polyhydroxy compounds and partial ethers of polyhydroxy compounds.

55. The composition of claim 52 with (F) at least one oil-soluble, water-insoluble functional additive.

56. The composition of claim 1 with about 25% to about 70% water, the composition being an aqueous concentrate.

57. The composition of claim 56 with (G) a dispersion enhancer selected from the group consisting of polyhydroxy compounds and partial ethers of polyhydroxy compounds.

58. The composition of claim 56 with (F) at least one oil-soluble, water-insoluble functional additive.

59. A water-based functional fluid made by diluting the composition of claim 56 with water wherein the ratio of water to said composition is in the range of about 80:20 to about 99:1.

60. A water-based functional fluid made by diluting the composition of claim 57 with water wherein the ratio of water to said composition is in the range of about 80:20 to about 99:1.

61. A water-based functional fluid made by diluting the composition of claim 58 with water wherein the ratio of water to said composition is in the range of about 80:20 to about 99:1.

62. A method for preparing aqueous systems, including both aqueous concentrates and water-based functional fluids, which comprises the steps of:
 (1) mixing the composition of any of claims 1-27, 28, 29, 30-32, 33-36, 37-40, 41-46 or 47-51 to form a dispersion/solution, the water content of said dispersion/solution being less than about 25% by weight; optionally
 (2) combining said dispersion/solution with additional water to form said concentrate; and/or optionally
 (3) diluting said concentrate or dispersion/solution with additional water wherein the total amount of water used is in the amount required to provide the desired concentration of component (B) in said water-based functional fluid.

* * * * *

UNITED STATES PATENT AND TRADEMARK OFFICE
CERTIFICATE OF CORRECTION

PATENT NO.  : B1 4,468,339
DATED       : May 16, 1989
INVENTOR(S) : Rysek, Joseph J. and Forsberg, John W.

It is certified that error appears in the above-identified patent and that said Letters Patent is hereby corrected as shown below:

Title page, top of page, change "B1 Des. 292,913" to --B1 4,468,339--.

Title page, left column, after "Reexamination Certificate For:" change "Patent No.: Des. 292,913" to --Patent No.: 4,468,339--.

Signed and Sealed this

Twenty-seventh Day of January, 1998

Attest:

BRUCE LEHMAN

Attesting Officer    Commissioner of Patents and Trademarks